(12) United States Patent
Arrasvuori et al.

(10) Patent No.: US 8,725,706 B2
(45) Date of Patent: May 13, 2014

(54) METHOD AND APPARATUS FOR MULTI-ITEM SEARCHING

(75) Inventors: Juha Henrik Arrasvuori, Tempere (FI); Elina Maria Inkeri Ollila, Kirkkonummi (FI); Mika Antero Rautava, Helsinki (FI); Olli Esa Immonen, Helsinki (FI); Bernard Berus, Berlin (DE); Michael James Tudor, Dorset (GB)

(73) Assignee: Nokia Corporation, Espoo (FI)

( * ) Notice: Subject to any disclaimer, the term of this patent is extended or adjusted under 35 U.S.C. 154(b) by 49 days.

(21) Appl. No.: 12/784,388

(22) Filed: May 20, 2010

(65) Prior Publication Data

US 2011/0238690 A1 Sep. 29, 2011

Related U.S. Application Data

(63) Continuation-in-part of application No. 12/732,503, filed on Mar. 26, 2010, now abandoned.

(51) Int. Cl.
*G06F 17/30* (2006.01)
(52) U.S. Cl.
CPC .................... *G06F 17/30* (2013.01)
USPC ........... 707/700; 707/713; 707/722; 707/736; 707/758; 707/781
(58) Field of Classification Search
CPC ..................................... G06F 17/30
USPC ................................................ 707/600–899
See application file for complete search history.

(56) References Cited

U.S. PATENT DOCUMENTS

| 6,865,483 | B1 | 3/2005 | Cook, III et al. | |
| 7,715,981 | B2 | 5/2010 | Bradley et al. | |
| 2008/0065622 | A1* | 3/2008 | Goto et al. | 707/5 |
| 2009/0010003 | A1 | 1/2009 | Kirsten | |
| 2009/0019031 | A1* | 1/2009 | Krovitz et al. | 707/5 |
| 2009/0111487 | A1* | 4/2009 | Scheibe | 455/456.6 |
| 2009/0171570 | A1 | 7/2009 | Chiba | |
| 2010/0007736 | A1 | 1/2010 | Mori et al. | |
| 2011/0099180 | A1 | 4/2011 | Arrasvuori | |

FOREIGN PATENT DOCUMENTS

| JP | 2008286687 A | 11/2008 |
| JP | 2009069403 A | 4/2009 |
| TW | 201017128 A | 5/2010 |
| WO | 2010057531 A | 5/2010 |

* cited by examiner

*Primary Examiner* — Isaac M Woo
(74) *Attorney, Agent, or Firm* — Ditthavong Mori & Steiner, P.C.

(57) ABSTRACT

An approach is provided for multi-item searching. A searching platform receives an input at a device for specifying one or more search criteria. The searching platform then causes, at least in part, a search for one or more services based, at least in part, on the one or more search criteria, and a presentation of a user interface including an animation based, at least in part, on the search, one or more results of the search, the one or more services, or a combination thereof.

20 Claims, 19 Drawing Sheets

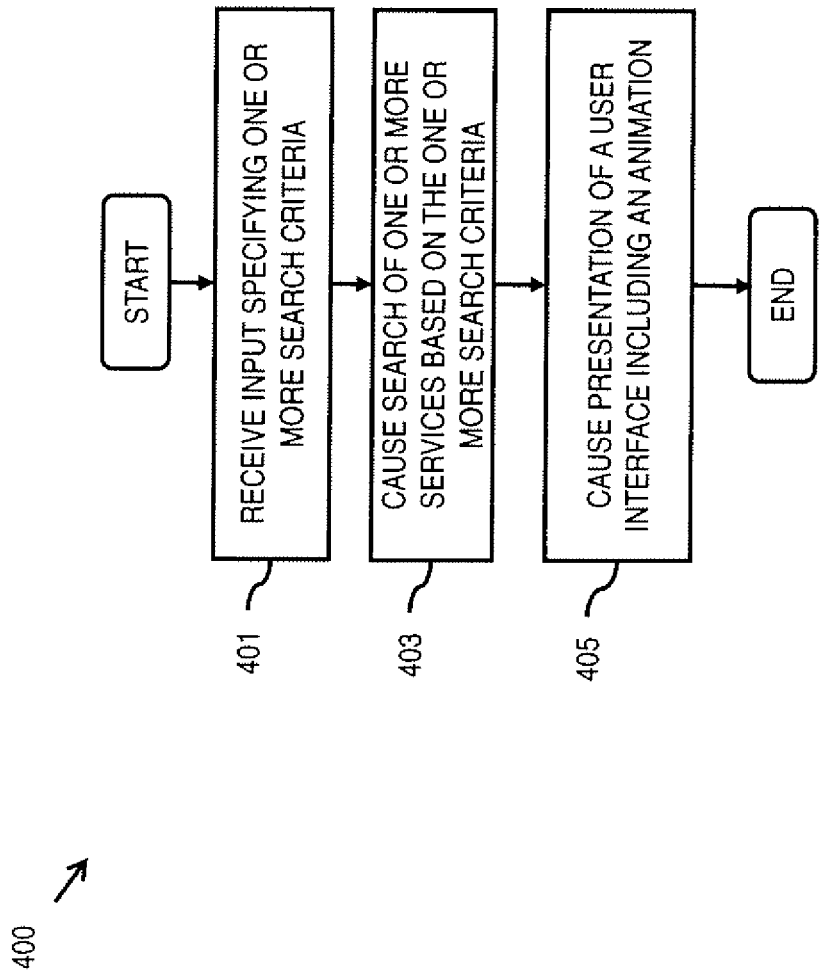

METHOD AND APPARATUS FOR MULTI-ITEM SEARCHING

RELATED APPLICATION

This application claims priority to and is a Continuation-In-Part of U.S. application Ser. No. 12/732,503 filed Mar. 26, 2010, which is incorporated herein by reference in its entirety.

BACKGROUND

Service providers and device manufacturers (e.g., wireless, cellular, etc.) are continually challenged to deliver value and convenience to consumers by, for example, providing compelling systems and services. For example, such services can include search functions such as locating points-of-interest in a mapping service or finding relevant feeds on social network sites. As such, important differentiators in the industry relate to the user interface of such systems and services.

SOME EXAMPLE EMBODIMENTS

Therefore, there is a need for an approach for conducting searches over various services (e.g., mapping services, social network services, etc.) and then presenting the search results for efficient use.

According to one embodiment, a method comprises receiving an input at a device for specifying one or more search criteria. The method also comprises causing, at least in part, a search for one or more services based, at least in part, on the one or more search criteria. The method further comprises causing, at least in part, presentation of a user interface including an animation based, at least in part, on the search, one or more results of the search, the one or more services, or a combination thereof.

According to another embodiment, an apparatus comprising at least one processor, and at least one memory including computer program code, the at least one memory and the computer program code configured to, with the at least one processor, cause, at least in part, the apparatus to receive an input at a device for specifying one or more search criteria. The apparatus is also caused to cause, at least in part, a search for one or more services based, at least in part, on the one or more search criteria. The apparatus is further caused to cause, at least in part, presentation of a user interface including an animation based, at least in part, on the search, one or more results of the search, the one or more services, or a combination thereof.

According to another embodiment, a computer-readable storage medium carrying one or more sequences of one or more instructions which, when executed by one or more processors, cause, at least in part, an apparatus to receive an input at a device for specifying one or more search criteria. The apparatus is also caused to cause, at least in part, a search for one or more services based, at least in part, on the one or more search criteria. The apparatus is further caused to cause, at least in part, presentation of a user interface including an animation based, at least in part, on the search, one or more results of the search, the one or more services, or a combination thereof.

According to another embodiment, an apparatus comprises means for receiving an input at a device for specifying one or more a search criteria. The apparatus also comprises means for causing, at least in part, a search for one or more services based, at least in part, on the one or more search criteria. The apparatus further comprises means for causing, at least in part, presentation of a user interface including an animation based, at least in part, on the search, one or more results of the search, the one or more services, or a combination thereof.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4E are flowcharts of processes for presenting search information based on search parameters including a specified location and/or social networks, according to various embodiments;

DESCRIPTION OF SOME EMBODIMENTS

Examples of a method, apparatus, and computer program for searching and presenting locations of interest and/or relevant social network sites feeds in accordance with one or more ripples emanating from a search location are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
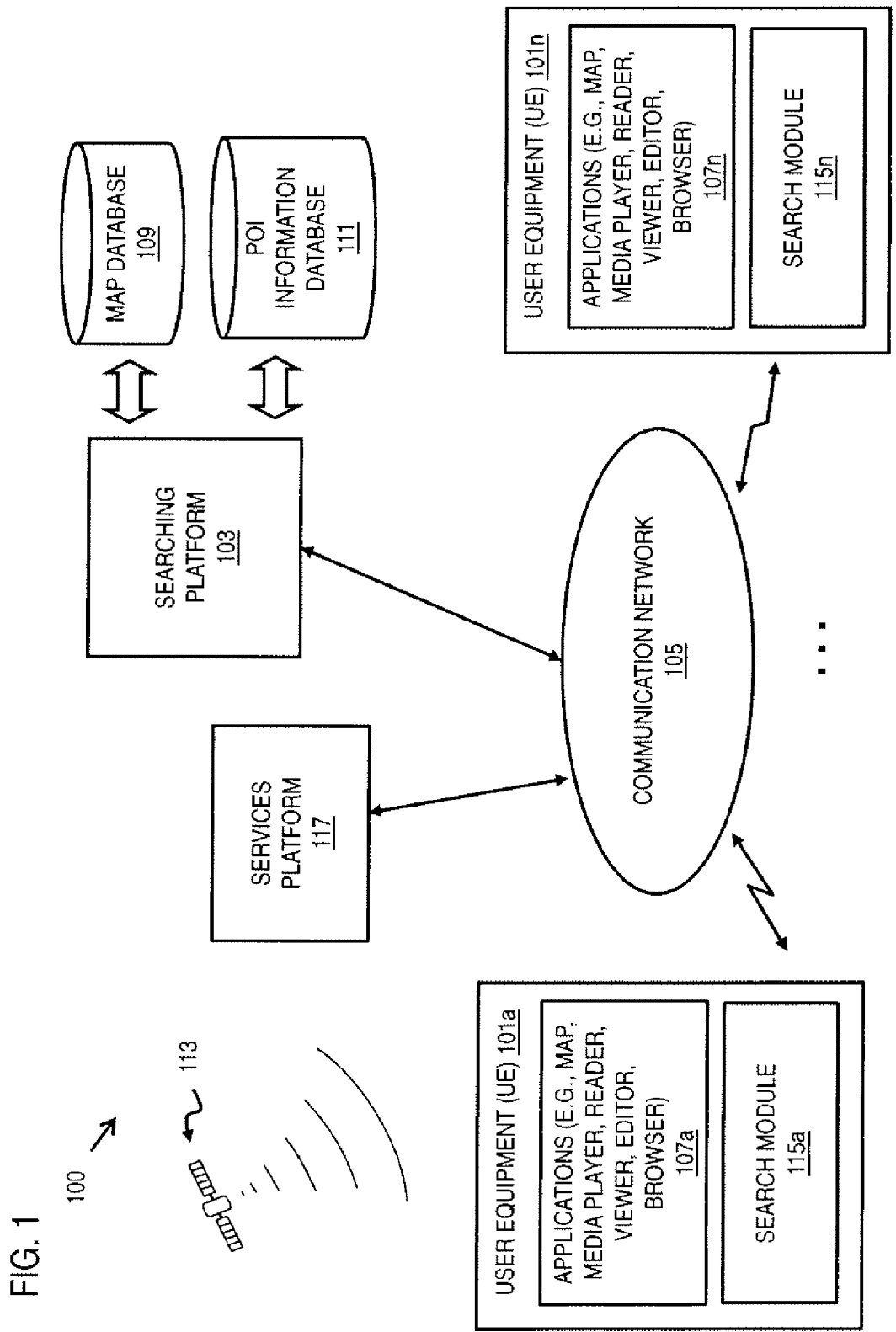
FIG. 1 is a diagram of a system including user equipment capable of causing a search based on a search location and/or services, according to one embodiment.

FIG. 1 is a diagram of a system including user equipment capable of causing a search based on a search location and/or services, according to one embodiment. As available content and the number of social network sites on the internet rapidly grow, users are finding it more challenging and demanding when they want to search the internet for content or social network sites or feeds. Social network feeds can be described information and/or links found on a given social network site related to any given topic. However, if the user experience associated with searching and finding social network site related content is improved, users would be more apt to use such services and consume such content. For example, ease of finding feeds and content automatically or with less effort, can potentially increase user traffic on social network sites. Further, reducing the burden associated with defining and then acting on user-specified search terms can also contribute to the improved user experience. Furthermore, presenting the search results with added animation could render the results more user friendly, easier to understand and more fun for the user to utilize. Such user experience improvement can be made available if some of the search functionality could be made seamless between applications present on or interfacing with the user equipment.

In certain embodiments, the system is capable of conducting searches and/or presenting the search results (e.g., locations of interest in a mapping service or feeds in a social network service) in accordance with one or more ripple animations emanating from a search location. A ripple is one or more ridges or edges that move or animate across a user interface. Metaphorically speaking, a ripple can be compared to waves generated by a pebble when the pebble is thrown into a pond or other water source. As time passes, the edge of a ripple expands and can be followed outwards incrementally from a point of origin. In certain embodiments, when the ripple reaches a certain point (e.g., a predetermined distance, edge of presentation, etc.), the ripple may reverse its direction and turn inwards.

In another embodiment, the system is capable of searching for points of interest or other information on one or more social network sites (e.g., feeds, friends, status updates, etc.). A social network site can be described as an internet social structure made of individuals or organizations which are connected by one or more types of interdependency, such as friendship, kinship, common interest, financial exchange, dislike, beliefs, knowledge, prestige and/or the like. Search results may be presented as social network site feeds which may allow the user of a user equipment to login or join the one or more social network sites. Furthermore, the system can provide a process for logging in or joining the one or more social network sites.

As noted above, it is often useful for users of devices to obtain information about locations of interests such as points-of-interest (POIs). In certain embodiments, a location of interest or POI is a specific location that a person may, for instance, find interesting or useful, such as locations that provide one or more goods, services, or attractions. These locations of interest can be physical locations or internet locations such as one or more social network sites. Examples of POIs or locations of interest can include public transportation, such as an airport, bus stops, subway and train stops, etc., stores, such as a bakery, a sports shop, a music shop, department stores, etc., a dam, a landmark, a restaurant, a hotel, or any point interesting, useful, or significant in some way. Further, social network sites can include private or public internet sites such as a personal internet site available only to a closed group of users or public sites such as Facebook®, Twitter®, YouTube®, an internet music store, book store, and/or any other internet site. For example, a POI may be the location of an event (e.g., an event posted on a social networking site, sent to the user via e-mail, on the user's calendar, etc.). Further, POIs may include geo-tagged information items represent physical items at an interesting location and/or media (e.g., video, images, audio, etc.) or other identifiable information that can be associated with locations using coordinates (e.g., longitude, latitude, altitude, etc.) or other location information. When users are new or unfamiliar to a location, they may wish to obtain information about one or more POIs that may be useful to the users. Conventionally, these POIs can be presented on a map interface showing visual indicators of the POIs. Furthermore, search results may be presented as social network site feeds matching the search criteria.

To receive targeted information about POIs, a user may select a region or location from which to find POIs. Further, the user may provide search criteria that the POIs should meet. Many POIs may be present in the region or locations that meet the search criteria. However, the amount of POIs available to the user can be problematic to the user's ability to select POIs to utilize. In fact, so many POIs may meet the search criteria that the user is unable to ascertain the meaning of the information associated with the POIs. For example, there may be so many POIs available to the user that the user is unable to determine which ones to select. In certain examples, devices may have a limited presentation environment due to screen size limitations associated with user devices. Presenting all of the POIs simultaneously can cause jumbling of POIs which can make it difficult for the user to utilize the information presented to the user. Furthermore, the search criteria can be provided by one or more applications present on the user equipment, such as one or more applications $107a$-$107n$ (also collectively referred to as applications 107), or can be provided by user of one or more user equipment $101a$-$101n$ (also collectively referred to as UE 101). Such search criteria can be highlighted, selected and/or be active content within an application on the UE 101 and/or at a network location. Active content can be content currently is use by the user, by the UE 101 and/or by another network component.

In an embodiment, user of UE 101 is listening to a musical track by a specific artist. The user may select (e.g., by clicking, highlighting) the artist's name. This selection can be the input into one or more search module $115a$-$115n$ (also collectively referred to as search module 115). The search module 115 may provide options to the user as how a search should be conducted. Once the user inputs his options, the search module 115 will cause a search on the internet and will present the search results in accordance with presentation options. Also, it should be noted that applications 107 may perform some of functionalities of search module 115 and/or the search module 115 may perform some of functionalities of applications 107.

In another embodiment, the search criteria is provided by a text reader and/or editor application, such as an e-reader, of applications 107 where the user selects one or more words and which become a search criteria input into the search module 115; a search based on the one or more words is caused and the search results are further refined based on user defined search criteria such as author, publisher, other books by author, other books by same publisher, other books on same topic and/or the like. It is understood that reference to a book is an example of any text based, and/or graphical content. Furthermore, search module 115 causes a search on social network sites for feeds based on the search criteria.

In another embodiment, the search criteria are graphical content, such as one or more picture and/or drawing, provided by the user or applications 107. The graphical content is used as search criteria input into search module 115. Also, graphical content can be provided by such applications as a map application of applications 107.

In another embodiment, the search criteria is based on context of content, user location, other sensory information obtained from UE 101 and/or form one or more other network component, and/or a combination thereof.

In another embodiment, the search module 115 and applications 107 are substantially operating concurrently. Information from applications 107; such as music type, music album information, or any content information; is input into search module 115 as search criteria. For example, while a music player application is playing jazz music, POIs related to keyword "Jazz" are shown in the search ripple on a map, while animation of search ripple is substantially synchronized with an element of the music being played (such as drum beat, rhythm of the music and/or the like).

To address this problem, system 100 of FIG. 1 introduces the capability to present locations of interest in accordance with one or more ripples from a search location. Although various embodiments are described with respect to circular ripples (e.g., like water ripples), it is contemplated that the ripples in the approach described herein can take any geometric or irregular shape. In one embodiment, the user may be provided the option to input parameters of a search and a search location via a graphical user interface (GUI) associated with the user's UE 101 to search for POIs. The results of the search can be provided to the user via the GUI in accordance with the ripple effect for display. In this manner, POIs are presented to the user based, at least in part, on one or more ripples. As previously noted, in certain embodiments, each ripple includes a search perimeter for search information that emanates from the search location. Further, the system 100 provides the capability to present points of interest on the internet, such as one or more social network sites matching the search criteria.

The input parameters can be formed into a query to a searching platform 103 and/or a services platform 117 via a communication network 105 to process the search. An application 107 or search module 115 of the UE 101 may be used to receive the input parameters. Moreover, the searching platform 103 may use a map database 109 and a POI information database 111 to determine search output—such as search results for the search query. Further, the services platform 117 and the searching platform 103 may communicate via communication network 105 in order to complete the search and present the search results to the user of UE 101. The application 107 of the UE 101 may be used to determine a current location of the UE 101 using global positioning system (GPS) satellites 113, for example. The current location of the UE 101 may be used in determining search options that can be presented to the user on the GUI. Moreover, the current location may be displayed to the user to show the relationship of the user's current location to areas on the map where results are presented.

In one scenario, the user is presented a GUI that allows the user to enter criteria about the POI that the user wishes to gather information about. The criteria can include categories (e.g., restaurant, music store, sports store, park, park photographs etc.), names (e.g., The Compact Disc Shop, Central Park, Theme Park photographs, etc.), or other keyword search terms provided by one or more applications on UE 101. Also, the search criteria can be provided by applications other than those present on the UE 101 from other network components such as cloud computing, servers, and/or other user equipment. Further, the criteria may be input via a vocal means (e.g., by entering audio into a microphone associated with the UE 101 and the application 107 converting the vocal information into search criteria). Moreover, the user can enter parameters to determine one or more search locations. In some embodiments, the UE 101 may include a touch screen interface and the user may select the search locations via the interface. Further, the user may enter the search locations based on other forms of input, such as textual input of the location (e.g., area code, city and state, street address, etc.). Moreover, the user may use one form of input to focus a user interface of the UE 101 to an area and then input the search locations using another form of input (e.g., via touch screen, scroll and click mechanisms, keyboard, virtual keyboard, etc.). In some examples, the GUI includes a map image from which the search locations can be selected. One or more criteria describing the POIs the user desires can be associated with each search location. As previously noted, this information can be formed into a query and sent to the searching platform 103. As such, the application 107 and/or search module 115 causes, at least in part, a search for one or more locations of interest based, at least in part, on the search location(s). In certain scenarios, the UE 101 includes the functionality of the searching platform 103.

The searching platform 103 receives requests from UE 101 to conduct a search based on parameters specified by the UE 101. The searching platform 103 may receive a request from a UE 101 to perform a search on a map. The request can specify search parameters (e.g., a search keyword and one or more search locations). Moreover, the searching platform 103 may then run an analysis using search parameters from the UE 101 based on information from a map database 109 and/or a POI information database 111. Once the analysis is complete, the searching platform 103 may generate a response message to send the UE 101 informing the UE 101 of the search results. In one embodiment, the request may be a request for information about POIs within a search region (e.g., displayed map area on the UE 101), within a predetermined distance from the selected search locations, etc. The request can then be processed to determine the response message. In this embodiment, the response message may include resultant POIs (e.g., geo-tagged items) and/or locations of the POIs.

The map database 109 may include location data and may be utilized in the search process. By way of example, the location data may include geographic data such as street name data, elevation data, geographic structure data (e.g., rivers, hills, mountains, oceans, etc.) as well as POI data, such as landmark data, restaurant data, store data, and the like. The map database 109 may additionally associate geographic coordinates to the map. Moreover, the map database 109 may include location coordinates of the POI data. The map database 109, a subset of the map database 109, or another map database may be stored on the UE 101. In this manner, the UE 101 need not download specific geographic map data each time the UE 101 generates a request to the searching platform 103. Further, the map database 109 may include travel information (e.g., metro access points, bus stop information, etc.) about different POIs on the map.

The POI information database 111 stores information about POIs including geo-tagged information items, and may be synchronized to the map database 109 so that coordinates and/or locations of interest of each database may correspond to each other. The POI information may include coordinates that are associated with a longitude, latitude, and/or altitude. Additionally, POI information may include information about the name and other attributes of the POIs (e.g., the type of POI (e.g., geo-tagged information item, physical POI, etc.), ratings, cost of utilizing POIs, services for the POIs, goods purchased from the POIs, etc.).

When the application 107 has POI information associated with the requested search, the application 107 and/or search module 115 can cause, at least in part, presentation of the GUI including an animation of one or more ripples emanating or originating from the search location(s). The application 107 can determine when an edge of one of the ripples approaches one of the POIs in the results. When the edge is within a predetermined distance of the respective POIs, the POIs are presented. In certain embodiments, once the POIs are presented, the POIs remain on display. In other embodiments, when the edge is within another predetermined distance from the POI after passing the POI, the POI is removed from display. Further, the presentation of the POIs can be fluid and dynamic with the POI being presented or partially presented when the ripple edge is within the predetermined distance of the POI, become more prominent until a threshold distance, become less prominent from the threshold distance to another threshold distance, and be removed from display at the other predetermined distance. In certain scenarios, a POI that is presented in a manner that it may be removed can be selected to remain persistent and continuously be displayed on the GUI.

In certain scenarios, more than one search location is selected. In these scenarios, the search locations can each have different search criteria or the same search criteria can be utilized for each search location. Moreover, the search criteria may include Boolean parameters for finding POIs. These Boolean parameters may include "and," "or," "not," "exclusive or," or other Boolean functions between search terms for a keyword search. Further, Boolean parameters may be utilized for determining the presentation to the user. For example, Boolean parameters may be utilized to modify when POIs are presented in accordance with one or more ripples emanating from each search location. In one example, a POI may be presented if the POI is within a predetermined distance from two or more respective edges of ripples emanating from two different locations. In other embodiments, the POI may be presented when one ripple passes over the POI and removed from presentation when another ripple (e.g., from the search location or another search location) passes over the POI. An advantage to presenting the search results according to search ripples is to allow presentation of multiple results in limited screen space where, if all of the search results were presented, the user may become confused. As such, the application 107 can be a means for presenting the search results according to search ripples.

In other scenarios, the search locations may be associated with one or more time parameters. A time parameter associated with a search location can include a time when the user will be at or nearby the search location. For example, the user may be planning on going to a mall at 1 PM and being at a friend's residence two miles away at 3 PM. As such, a first search location associated with the mall location can be selected with a time parameter of 1 PM and a second search locations associated with the friend's residence can be selected with a time parameter of 3 PM. Multiple types of input may be utilized in acquiring the time parameter (e.g., voice input, keyed in input, etc.). The time parameters may be utilized in filtering POIs for presentation to the user. For example, the time parameters may be used to determine which POIs can feasibly or easily be utilized by the user. The filtering can include information associated with the type of travel (e.g., car, walking, biking, train, bus, etc.) of the user, schedules associated with such types of travel, distance, time allotted to utilize the services of particular POIs, etc. Moreover, the time parameters can be utilized to recommend one or more POIs based on the feasibility or ease of travel to the POI. Additionally or alternatively, the time parameters can be utilized to determine whether the POIs are operational during the time the user may be at the POI. The POI information database 111 can include the operational hours and/or other operational information (e.g., days when the POI is unavailable, etc.) for the determination. As such, the POIs may be filtered based on the operating hours of the POIs. Further, these search locations may include a boundary parameter. The boundary parameter can be based, at least in part, on user input, e.g., a search perimeter. Examples of specifying the boundary parameter are detailed in FIG. 3C and FIG. 3D.

Additionally, the application 107 can recommend a direction of travel from a search location to POIs. For example, if the application 107 determines that a concentration of POIs are located nearby the search location, these POIs may be highlighted. In this manner, the user is able to receive variety and options conveniently. The recommendation, search results, and/or animation can be saved for later presentation.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, the searching platform 103 and services platform 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the application 107, the searching platform 103 and/or the services platform 117 may interact according to a client-server model. According to the client-server model, a client process sends a message including a request to a server process, and the server process responds by providing a service (e.g., map, POI, and/or navigation services). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
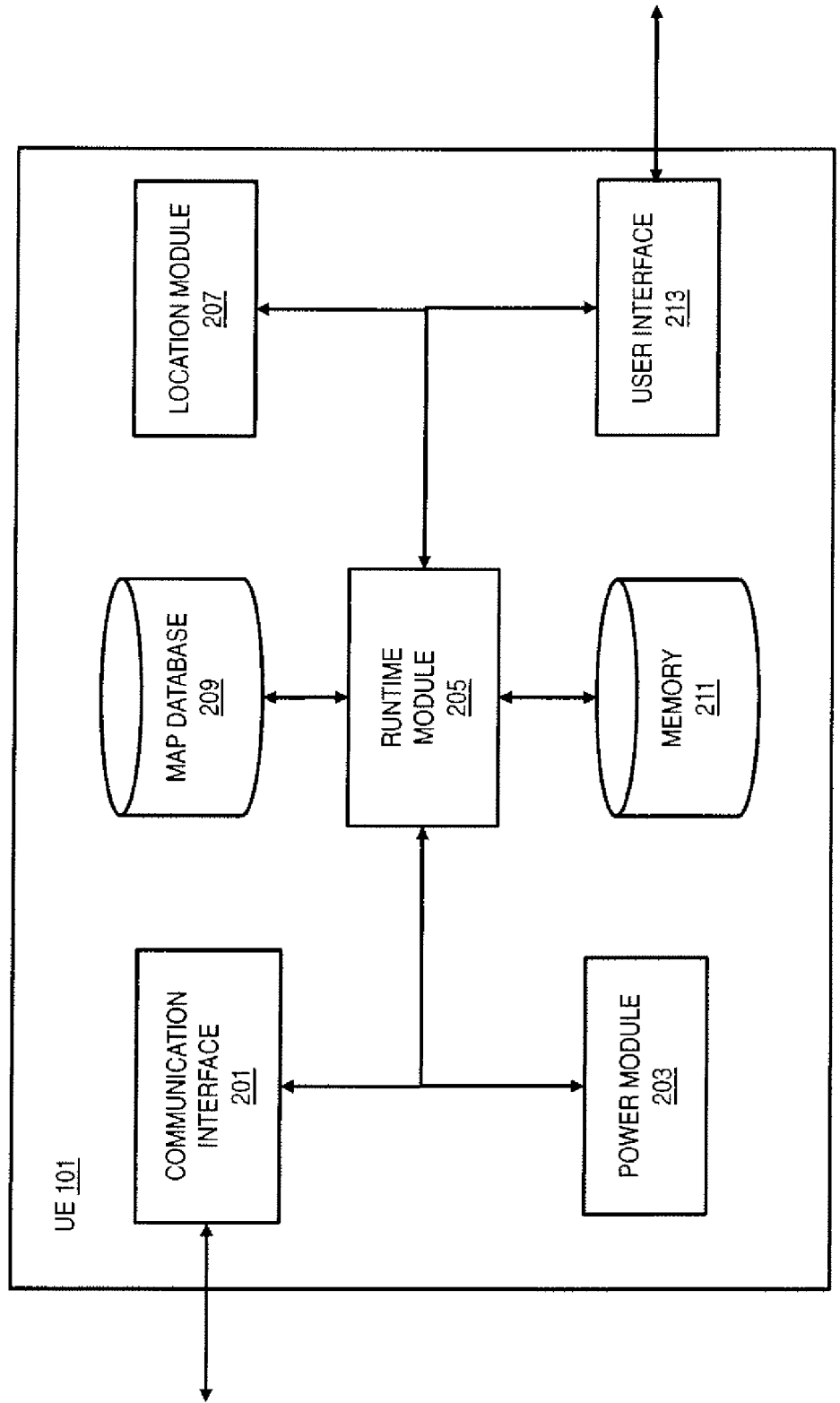
FIG. 2 is a diagram of the components of a user equipment capable of causing a search based on a user provided region, according to one embodiment.

FIG. 2 is a diagram of the components of a user equipment capable of causing a search based on a user provided search region, according to one embodiment, according to one embodiment. By way of example, the UE 101 includes one or more components for causing a presentation of POIs based on ripples emanating from search locations. It is contemplated that the functions of these components may be combined in one or more components or performed by other components of equivalent functionality. In this embodiment, the UE 101 includes a communication interface 201, a power module 203, a runtime module 205, a location module 207, a map database 209, a memory 211, and a user interface 213.

In one embodiment, the communication interface 201 can be used to communicate with a searching platform 103, services platform 117 and/or other UE 101. Certain communications can be via methods such as an internet protocol, messaging, or any other communication method (e.g., via the communication network 105). In some examples, the UE 101 can send a query to a searching platform 103 and/or services platform 117 via the communication interface 201. The searching platform 103 and/or services platform 117 may then send a response back via the communication interface 201. Moreover, the UE 101 may communicate with other UE 101 to synchronize and share search data (e.g., search criteria, search locations, etc).

The power module 203 provides power to the UE 101. The power module 203 can include any type of power source (e.g., battery, plug-in, etc.). Additionally, the power module 203 can provide power to the components of the UE 101 including processors, memory, and transmitters.

The location module 207 can determine a user's location. The user's location can be determined by a triangulation system such as GPS, Assisted-GPS (A-GPS), Cell of Origin, or other location extrapolation technologies. Standard GPS and A-GPS systems can use satellites to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 207 may also utilize multiple technologies to detect the location of the UE 101. Location coordinates can be determined using the location module 207. These location coordinates can be used by the runtime module 205 to display a user location on a map on a user interface 213 of the UE 101. Further, the current location of the UE 101 can be utilized in other navigational calculations (e.g., movement, readjusting search locations based on the location of the UE 101, etc.).

The user interface 213 can include various methods of communication. For example, the user interface 213 can have outputs including a visual component (e.g., a screen), an audio component, a physical component (e.g., vibrations), and other methods of communication. User inputs can include a touch-screen interface, a scroll-and-click interface, a button interface, a microphone, etc. Moreover, the user interface 213 may be used to display maps from the map database 209 and POIs from the memory 211. In certain embodiments, the map database 209 includes the information or a set of the information in an external map database 109 or additional or separate map information. Moreover, the map database 209 can include visual indicators (e.g., icons, text, etc.) of the POIs. The user interface 213 can additionally be used to input search parameters including a keyword or other search, search locations, time parameters, search extent, etc. Further, as noted above, the user interface 213 can present the POIs in relation with search ripples emanating from respective search locations.

Figure 3B:
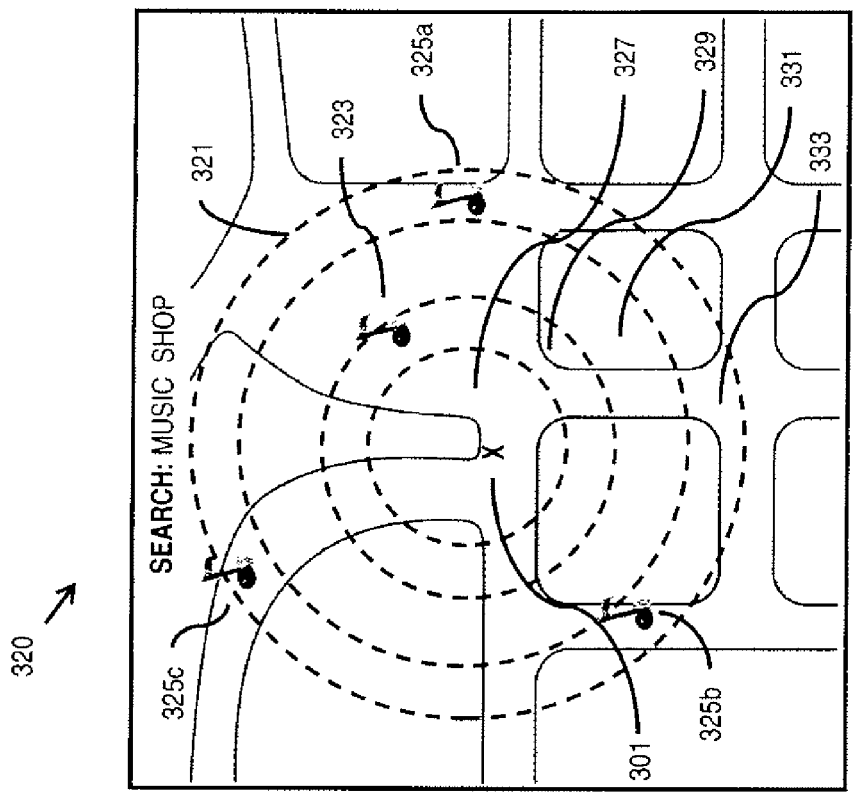
FIGS. 3A-3D are diagrams of user interfaces utilized by the user equipment, according to various embodiments.
Figure 3A:
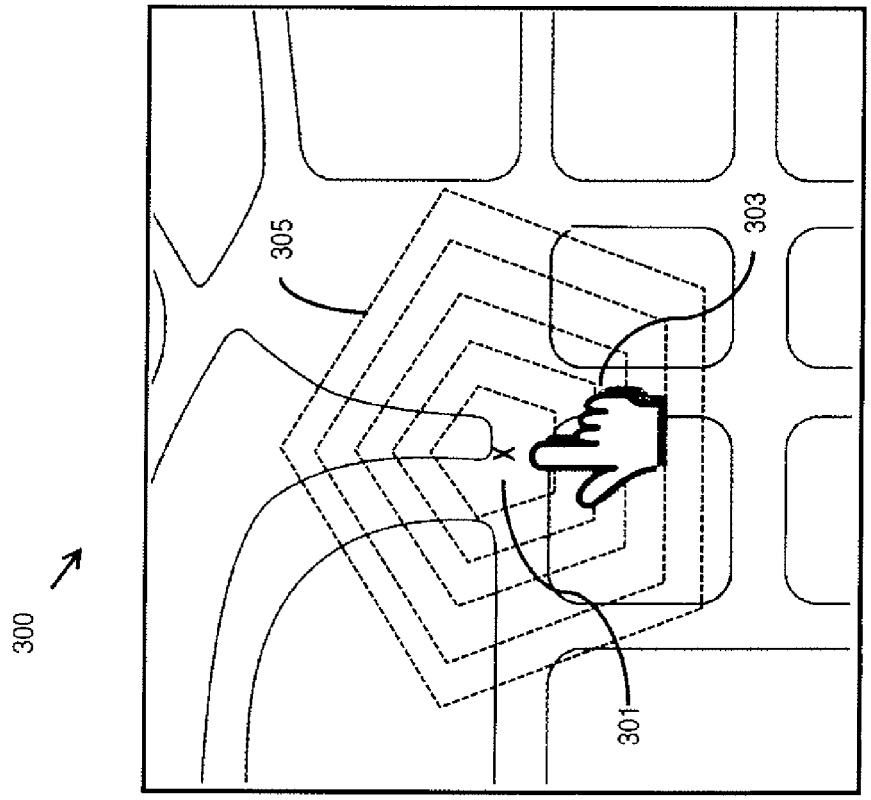

FIGS. 3A and 3B are diagrams of user interfaces 300, 320 utilized by the user equipment 101, according to various embodiments. The user may input a search term using one of the inputs of the user interface 300, 320 of the UE 101. The search term may be input as free text (e.g., via a keyboard-like interface) or selected from a predefined (e.g., hierarchical, categorical, etc.) list of search terms (e.g., higher level categories to lower level categories of POIs). The user may also be provided an opportunity to select one or more search locations. A search location 301 may be selected via an input mechanism (e.g., via touch screen 303). For sake of simplicity, one search location is selected in user interfaces 300 and 320.

The ripples used for determining presentation of the POIs can be one of any variety of shapes and sizes, depending on such factors as display size, cursor control capability, etc. In one embodiment, the user may select the shape from a predetermined set of shapes (e.g., a circle, a sector of a circle, a square, a rectangle, an oval, another polygon, etc.), including irregular shapes. For example, ripples emanating from the search location 301 can be the shape of a pentagon ripple 305 or circular ripple 321.

As noted above, the user interface 320 may be utilized to perform a search. In this scenario, a search for a "Music Shop" is requested for the search location 301. The search may be conducted on the UE 101 or at the searching platform 103. The results may include music shop results 323, 325a-325c. These results may be presented in accordance with the circular ripple 321 as the ripple is presented to the user. As such, the ripple can emanate from the search location 301. As the ripple expands to a first region 327 encompassing the search location, no search results are presented because no search results are within that first region 327. Then, as time passes, the search ripple expands to encompass a second region 329. This second region 329 includes music shop result 323. As the search ripple expands further, additional results are not presented in the third region 331 because no results were found in the location. Then, as the ripple expands further to include the fourth region 333, three music shop results 325a-325c are presented. In certain embodiments, the ripple itself need not be presented on the display. In these embodiments, the ripple effect can be displayed by displaying the resulting POIs in accordance with the ripple.

Figure 3D:
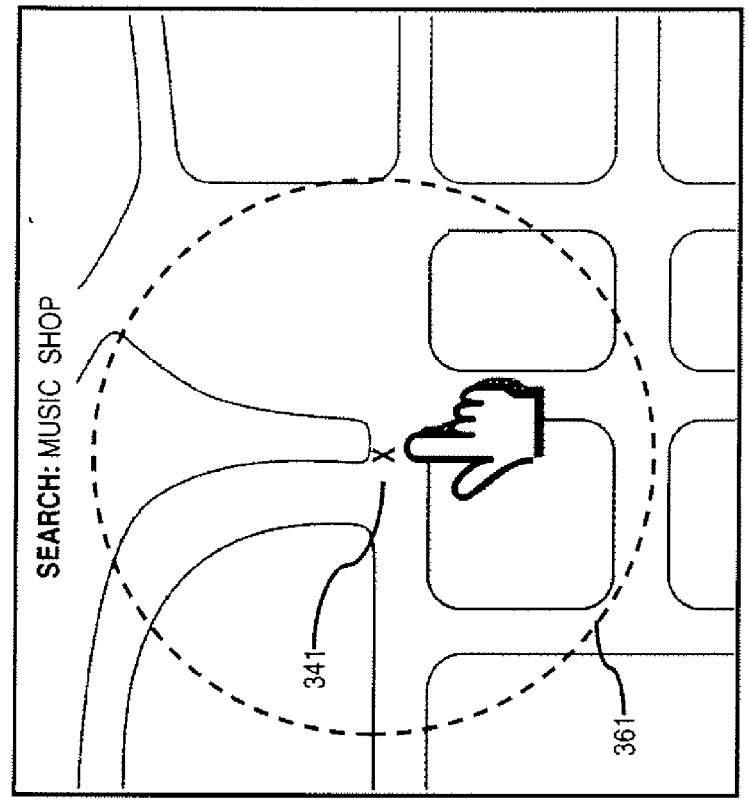
Figure 3C:
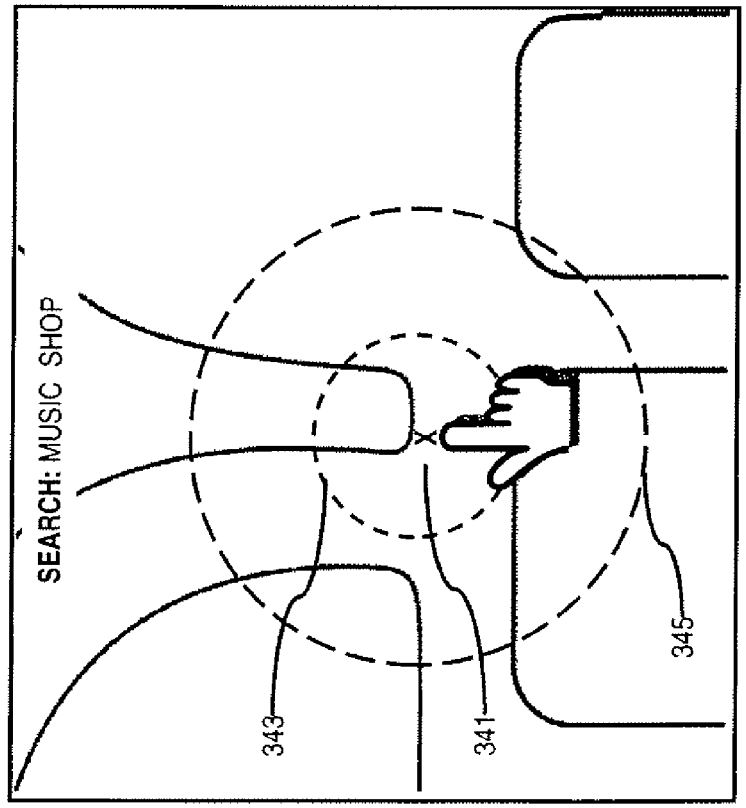

FIGS. 3C and 3D are diagrams of user interfaces 340, 360 utilized by the user equipment 101 to designate a search area for a search ripple, according to various embodiments. In user interface 340, the user may use a touch screen input and/or a scroll and click mechanism to designate a starting point 341 of a search ripple. Further, a search perimeter 343, 345 can be determined based on the designated central point 341 and a period of time and/or pressure of the selection of the starting point 341. For example, the longer the user presses on the starting point 341, the farther the search perimeter expands. As such, a short press can result in a smaller search perimeter 343 and a longer press can result in a larger search perimeter 345. A local search of the area (e.g., for a music shop) can additionally be entered. Further, for a UE 101 that enables a pressure based input, the pressure can determine the speed at which the search perimeter 343, 345 expands. As previously noted, the user may select the shape from a predetermined set of shapes (e.g., a circle, a sector of a circle, a square, a rectangle, an oval, another polygon, etc.), including irregular shapes from which the search perimeters 343, 345 are determined.

User interface 360 shows an expansion of the search perimeter 343, 345 of FIG. 3C after a period of time. The expansion of the search perimeter 343, 345 has gone past the limits of the displayed map of user interface 340. As such, the user interface 360 automatically resizes the map (e.g., zooms out) to allow for additional expansion of the search perimeter 361. When the user removes the input (e.g., removes finger from a touch screen interface), the search can be conducted on one or more search terms input by the user. In certain scenarios, the removal of the input triggers the search. Further, the removal of the input signifies the definition of the search perimeter. Moreover, in certain embodiments, the search perimeter signifies a boundary for the search ripples. In these embodiments, the search perimeter designates a greater bound for the expansion of search ripples. For example, in user interface 300, the expansion of the pentagon ripple 305 can be determined based on a search perimeter input. As such, ripple characteristics (e.g., expansion of the search ripple, the rebounding of the search ripple, etc.) can be based on the search perimeter.

Further, the search boundaries (e.g., search perimeter), in certain embodiments, can be three dimensional. In these embodiments, the search parameters may include a three dimensional element (e.g., a height) allowing for searching based additionally on an altitude of a POI. Further, search ripples may additionally expand and rebound based on the height parameter.

FIG. 4A is a flowchart of a process for presenting search information based on search parameters including a specified location and/or social networks, according to one embodiment. In one embodiment, the application 107 (e.g., executing on the runtime module 205) performs the process 400 and is implemented in, for instance, a chip set including a processor and a memory as shown FIG. 7. As such, the application 107 and/or runtime module 205 can provide means for accomplishing various parts of the process 400 as well as means for accomplishing other processes in conjunction with other components of the UE 101 and/or searching platform 103.

At 401, the application 107 receives an input for specifying a search location. As noted previously, the input can include one or more technologies (e.g., keyboard, touch screen, etc.), input from other applications on UE 101 and/or input received from other network components. The input can be specified in relation to a presentation of a map image via the UE 101 or in relation or other means of input. For example, the search location can be determined by cross referencing a zip code input. The zip code input can be correlated to an area and a location within the area can be selected as the search location. In one embodiment, the input can further include a length of time. The length of time can be determined based on how long the input is provided (e.g., as detailed in FIGS. 3C and 3D). The time of the input can then be used to determine a perimeter associated with the search area based on the search location. This perimeter can be presented on the map image. Further, the perimeter can be used to determine an area to search. Furthermore, the search criteria can be specified by other applications such as a music player. The music player can provide information regarding a currently playing sound track including information on the artist, track, publisher, producer and/or the like.

At 403, the application 107 causes, at least in part, a search for one or more locations of interest based, at least in part, on the search criteria. The application 107 can generate a query to request the search from the searching platform 103 and/or the services platform 117. Further, the application 107 can cause, at least in part, transmission of the query to the searching platform 103 and/or services platform 117. This query can include a search area or region based, at least in part, on the perimeter and/or other search criteria. Moreover, the application 107 can receive the results of the query from the searching platform 103 and/or services platform 117. The results can include one or more data structures associating the result of the search to one or more locations (e.g., locations on a displayed map image). In certain scenarios, the locations are associated in the data structures as positioning coordinates. Additionally or alternatively, the data structures can further include information about the locations of interest or POIs in the search results related to internet sites such as social network sites. This information can include tags or types associated with the POI as well as information about reviews, description, etc. Additionally, this information may be utilized in the search. Moreover, in certain embodiments, the search is conducted on the UE 101 using a map database 209 and/or other memory 211 on the UE 101. Further, the search results may be filtered based on one or more criteria. One such criteria can be time. For example, if time parameters are input, the search can account for time (e.g., search results that are not open during the specified time or time period are filtered out of the search results that can be presented). Additionally, search criteria such as a specific social network site (such as Facebook®, YouTube®, Flickr®) can be used to select results associated with such a social network site.

Then, at 405, the application 107 causes, at least in part, presentation of a user interface including an animation of one or more ripples emanating from the search location. The presentation can include a map image of a region including the search location. Additionally or alternatively, the search location can be outside of the visual presentation with the search ripples emanating from that location. In certain embodiments, the search ripples are bounded based, at least in part, on the perimeter. With this approach, the search ripples need not be presented past a boundary associated with the perimeter. The map image can be retrieved from the map database 209 and/or from the searching platform 103.

Figure 4B:
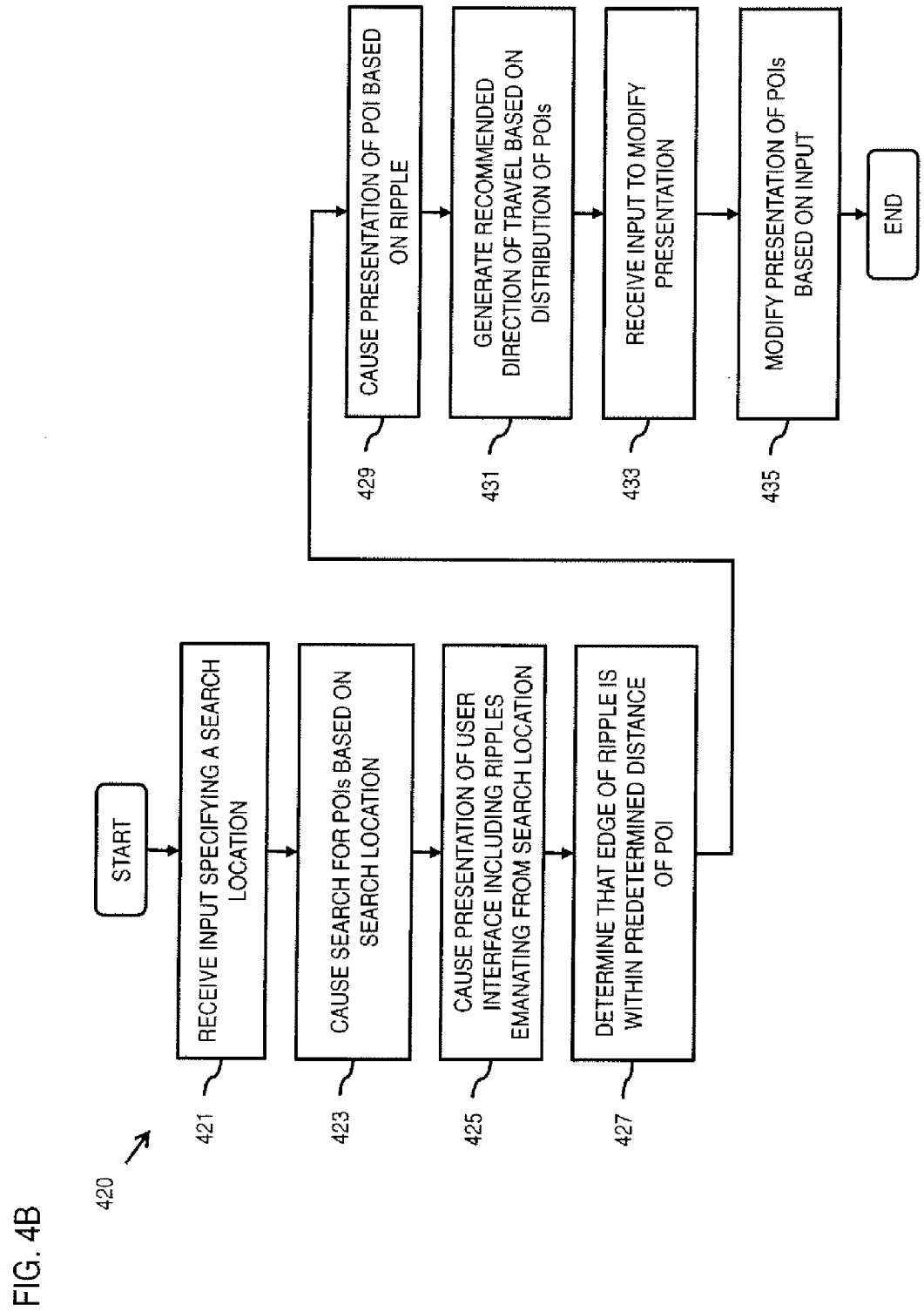

FIG. 4B is a flowchart of a process for presenting search information based on search parameters including a specified location and/or social network sites, according to one embodiment. In one embodiment, the application 107 (e.g., executing on the runtime module 205) performs the process 420 and is implemented in, for instance, a chip set including a processor and a memory as shown FIG. 7. As such, the application 107 and/or runtime module 205 can provide means for accomplishing various parts of the process 420 as well as means for accomplishing other processes in conjunction with other components of the UE 101 and/or searching platform 103.

At 421, the map application 107 receives an input for specifying a search location. As noted previously, the input can include one or more technologies (e.g., keyboard, touch screen, etc.). The input can be specified in relation to a presentation of a map image via the UE 101 or in relation or other means of input. For example, the search location can be determined by cross referencing a zip code input. The zip code input can be correlated to an area and a location within the area can be selected as the search location. In one embodiment, the input can further include a length of time. The length of time can be determined based on how long the input is provided (e.g., as detailed in FIGS. 3C and 3D). The time of the input can then be used to determine a perimeter associated with the search area based on the search location. This perimeter can be presented on the map image. Further, the perimeter can be used to determine an area to search.

At 423, the map application 107 causes, at least in part, a search for one or more locations of interest based, at least in part, on the search location. The map application 107 can generate a query to request the search from the map searching platform 103. Further, the map application 107 can cause, at least in part, transmission of the query to the map searching platform 103. This query can include a search area or region based, at least in part, on the perimeter. Moreover, the map application 107 can receive the results of the query from the map searching platform 103. The results can include one or more data structures associating the result of the search to one or more locations (e.g., locations on a displayed map image). In certain scenarios, the locations are associated in the data structures as positioning coordinates. Additionally or alternatively, the data structures can further include information about the locations of interest or POIs in the search results. This information can include tags or types associated with the POI as well as information about reviews, description, etc. Additionally, this information may be utilized in the search. Moreover, in certain embodiments, the search is conducted on the UE 101 using a map database 209 and/or other memory 211 on the UE 101. Further, the search results may be filtered based on one or more criteria. One such criterion can be time. For example, if time parameters are input, the search can account for time (e.g., search results that are not open during the specified time or time period are filtered out of the search results that can be presented).

Then, at 425, the map application 107 causes, at least in part, presentation of a user interface including an animation of one or more ripples emanating from the search location. The presentation can include a map image of a region including the search location. Additionally or alternatively, the search location can be outside of the visual presentation with the search ripples emanating from that location. In certain embodiments, the search ripples are bounded based, at least in part, on the perimeter. With this approach, the search ripples need not be presented past a boundary associated with the perimeter. The map image can be retrieved from the map database 209 and/or from the map searching platform 103.

At 427, the application 107 determines that an edge of at least one of the ripples is within a predetermined distance of one of the POIs found in response to the search. The predetermined distance can be calculated from any point of the ripple (e.g., the closest point) to the POI. Additionally or alternatively, the predetermined distance can be calculated from a point orthogonal to the POI. Determinations can be made to more than one predetermined distance from the ripple. For example, a first predetermined distance can be determined for when to begin presenting the POI and a second predetermined distance can be determined for when to end presenting the POI. Moreover, the predetermined distance can be associated with a direction. In this manner, the application 107 determines whether the ripple has passed the location of the POI and the distance is in front of the ripple or behind the ripple. With this approach, different tasks can be set to be performed based on the determined distance and/or direction of the ripple. Further, in certain embodiments, the direction the ripple is traveling can additionally be taken into account. For example, the ripple can emanate from the search location, hit a certain threshold location (e.g., a radius from the search location, an edge of the map image, etc.) and turn around and return back to the search location. Tasks (e.g., presentation of POIs, animating POIs, making the presentation of one or more POIs more prominent, etc.) can be set based on the distance to and direction of the ripple.

Next, at 429, the application 107 causes, at least in part, presentation of the location of interest (e.g., POI) in the user interface based, at least in part, on the determination that an edge of a ripple is within a predetermined distance of the POI. The presentation of a visual indicator of the POI (e.g., an icon, text, etc.) can take place when the distance from the ripple reaches the POI. In certain embodiments, the predetermined distance causes a portion of the visual indicator to be presented. As the ripple gets closer to the POI, the visual indicator becomes more prominent (e.g., brighter, changes color, becomes bold, etc.). Further, once the ripple passes the POI, the visual indicator can become less prominent. In some examples, when the ripple passes the POI by a certain predetermined distance, the visual indicator is removed from the presentation on the user interface. In this manner, the POI visual indicator can "pop" up when the ripple hits the location. This can be compared to a cork that pops up to the top of the surface of water. Optionally, when the visual indicator is removed from the presentation, it can lay in wait for another queue to be presented once more (e.g., when another ripple passes, etc.). In other words, the characteristics of the presentation of the POI are based on a proximity of the POI to the edge of the ripple. The characteristics can include visual characteristics (e.g., the presentation of the visual indicator) as well as other forms of presentation such as audio presentation (e.g., beeping sounds that are more prominent when POIs are nearby a ripple).

Further, the application 107 can generate and present a recommended direction of travel based, at least in part, on a distribution of the POIs found as search results (at 431). In this manner, the recommended direction can be made based on criteria associated with the POIs. For example, the recommendation can be made if at least a certain density (e.g., POIs for location area) is above a certain threshold level. Further, the POI recommendation may be made based on one or more parameters of the search result. For example, if the search looks for two distinct places (e.g., a music shop and a sports shop), the concentration may be required to include at least one of each type of shop. Further, input may be utilized to set the parameters.

Next, at 433, the application 107 receives input for modifying the presentation. The input may be utilized to set parameters for choosing what is presented by the application 107. Then, at 435, the application 107 causes modification of the presentation according to the received input and/or rules associated with the input. In certain embodiments, the received input specifies a frequency or speed of the ripples. As such, the ripples can be sped up by a gesture (e.g., stroking the map image from a point closer to the search location outwards) or slowed down using another gesture (e.g., stroking the map image from a point farther away from the search location towards the search location). In other embodiments, gestures and other input can set the frequency of ripples. The speed of ripples can correspond to how long it takes the ripple to traverse an area of the map image. The frequency of ripples may be how often another ripple is emanated from the search location.

Moreover, if more than one search location is utilized for presenting POIs, the individual search locations can be associated with different frequencies and/or speeds. Combinations of frequencies and speed can be utilized in rules for presenting POIs. For example, a rule can include showing a POI when one ripple passes over the POI and remove the POI from presentation when another ripple passes over it. The ripples may come from the same search location or a different search location. Moreover, in certain embodiments, ripples can emanate when another ripple disperses (e.g., when the ripple hits a predetermined threshold such as an edge of the presentation). Further, the ripple may turn back inward when it reaches the predetermined threshold or edge of the presentation. In certain scenarios, the predetermined threshold can be based, at least in part, on the perimeter.

In certain embodiments, the ripple can be triggered based on a moving location of the user (e.g., triggered by GPS). When the UE 101 moves a threshold distance, the search results and recommendations can be recalculated and presented. New ripples can be triggered based on the location and/or other factors such as time.

Figure 4C:
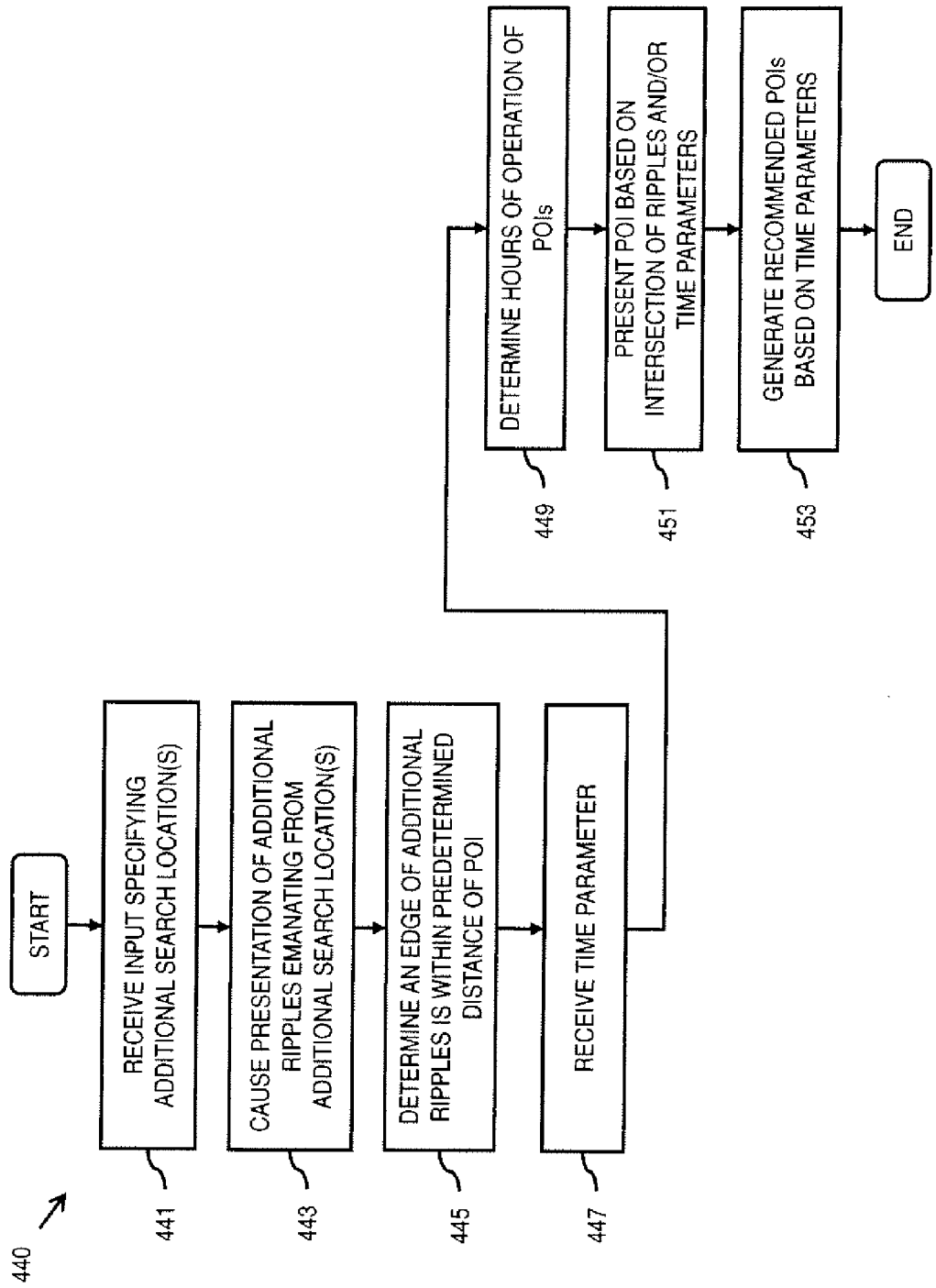

FIG. 4C is a flowchart of a process for presenting search information based on search parameters including a specified location and/or social network sites, according to one embodiment. In one embodiment, the application 107 (e.g., executing on the runtime module 205) performs the process 440 and is implemented in, for instance, a chip set including a processor and a memory as shown FIG. 7. As such, the application 107 and/or runtime module 205 can provide means for accomplishing various parts of the process 400 as well as means for accomplishing other processes in conjunction with other components of the UE 101 and/or searching platform 103.

Then, at 441, the application 107 receives input specifying additional search locations. This can occur while the search and search ripple of process 400 are being presented via the UE 101. As noted above, various types of technology (e.g., touch screen, point and click, etc.) can be utilized to receive the input. Using a similar approach to process 400, the application 107 causes, at least in part, presentation in the user interface of one or more other animations of one or more other ripples emanating from the specified search locations (at 443). With the additional search locations and/or search ripples, additional factors may be utilized in determining when and whether to display a POI result. In certain embodiments, additional input can be received specifying additional search criteria. For example, additional search criteria can include key words searching for another POI. Thus, a first search query can be presented via the first search location and another search query can be presented via a second search location. The second search query can be a part or modification of the first search query or can be a separate search query. As previously described, a search area for each additional search location can be specified using a user interface as described in FIGS. 3C and 3D.

In a manner similar to 427, the application 107 determines that an edge of a ripple associated with the second search location is within a predetermined distance of a POI (at 445). In certain embodiments, the POI is the same POI to be presented via 429. In other embodiments, the POI is associated with the second search query and the second search query is mutually exclusive (or partially mutually exclusive) from the first search query. As such, the presentation of the POI or other POIs can be based, at least in part, on input parameters according to one or more rules.

In one embodiment, at 447, the application 107 receives one or more time parameters associated with the search location. These time parameters may be utilized in determining when and whether a POI of the search results should be presented. For example, the time parameters may include when the user plans to be in and around the search location. In certain embodiments, the search results of the POIs include an operational time as to when the user will be able to access the POI. The operational time can be passed via the search to receive the search results or can be compared at by the application 107. As such, at 449, the application 107 can determine the hours of operation of POIs in the search results by parsing the hours of operation from POI information received as part of the search results. Further, the time parameters can be specified using a touch screen input as described in FIGS. 3C and 3D. In this scenario, the time parameters can be set based on the amount of time the user depresses a touch screen, the pressure of the depression, or the like. When the user stops the input (e.g., by taking the user's finger off of the touch screen input), the time parameter is set. For example, a time can be displayed on the user interface. The time can increase while the input is depressed and set when the input is no longer present.

At 451, the POI (or a group of POIs) is caused to be presented based on rules. One such rule is that only POIs that are operational during the time that the user inputs (e.g., a predetermined threshold time before and/or after a single time input or a time range) are presented. Another exemplary rule is that a POI is only presented if the POI is within one or more predetermined distances from more than one ripple emanating from different search locations. Further, an exemplary rule can include presenting the POI based on the number or concentration of other searched for POIs within a proximity of the POI. With this approach, a POI is not presented unless a sufficient threshold number of POIs are within a certain range of the POI. Additionally or alternatively, the rule may include a parameter for each of the search locations and their respective search results. The search results can be different for each search location. As such, a threshold number of more than one of the search results can be required for presentation. For example, if there are three search locations with different searches, at least one of two (or all three) of the searches associated with the search locations may be required by the rule to yield results within a range, area, or region of the POI in question of being presented.

Further, the application 107 can generate a recommended POI(s) from the POIs of the search results based, at least in part, on whether a user of the UE 101 can travel among the recommended POIs within the time parameters (at 433). In one scenario, the time parameters can be times when the user wishes to accomplish utilizing the POIs. As such, time information can be associated with the amount of time it may be necessary to utilize a POI. For example, shopping may take a minimum of at least 15 minutes in a store to park, search for an item, and check out before going to another recommended POI. In this manner, only POIs that can feasibly (e.g., meets minimum standards associated with POIs and additional traveling times) be traversed within certain time parameters are presented.

Figure 4D:
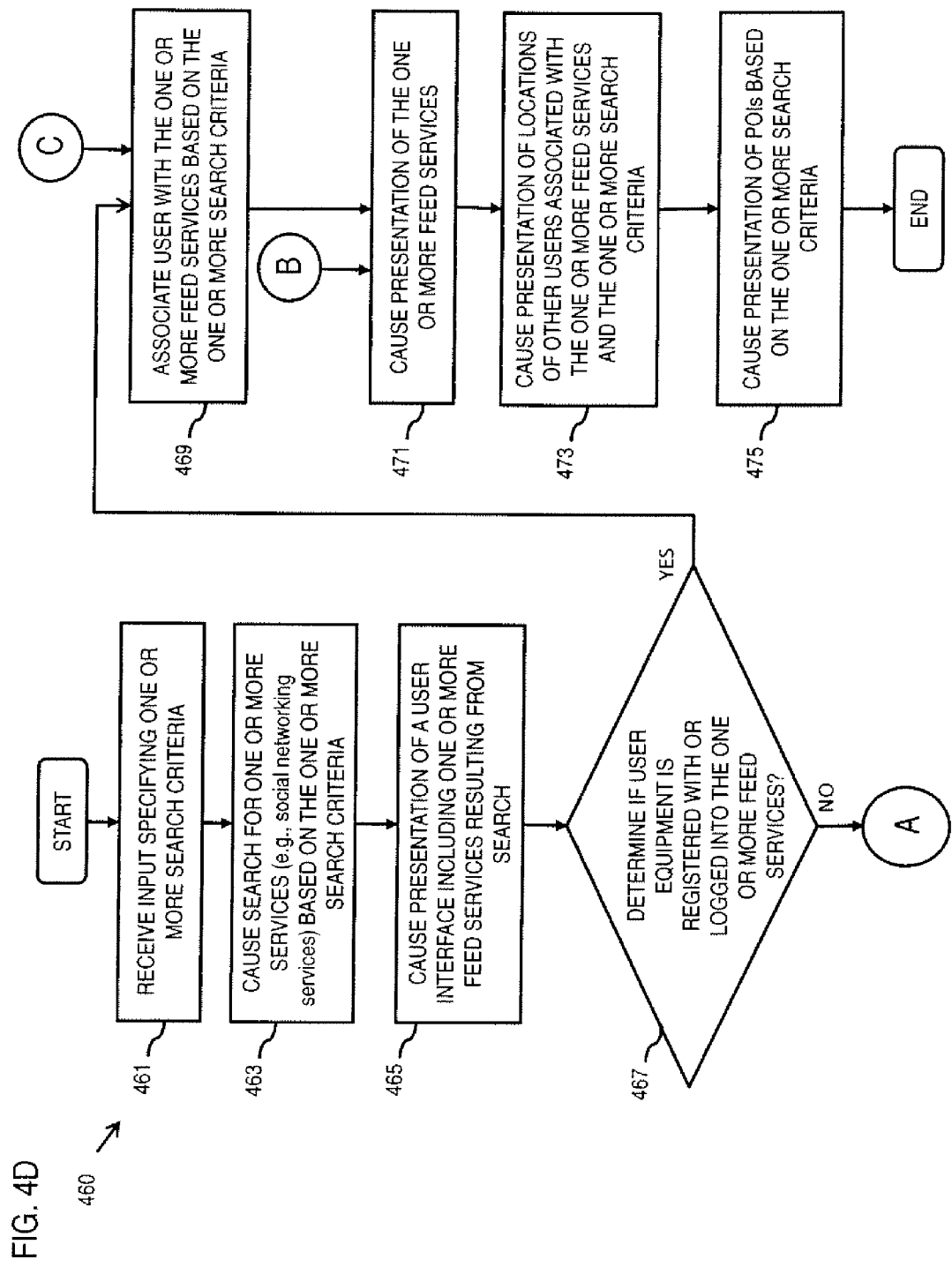
Figure 4E:
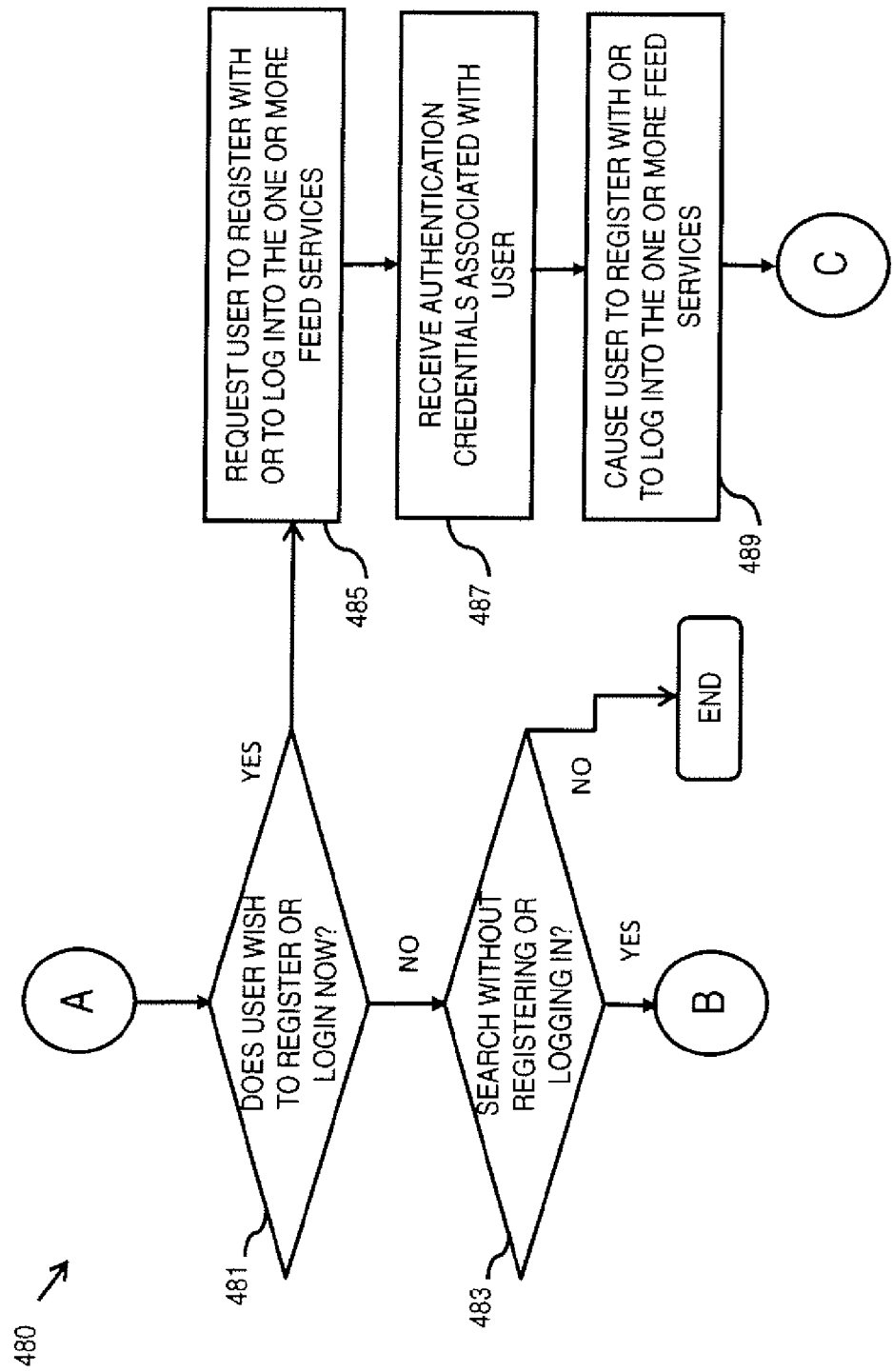

FIGS. 4D and 4E are flowcharts of processes for presenting search information based on search parameters including a specified location and/or social network sites, according to one embodiment. The process 460 of FIG. 4D is continues to the process 480 of FIG. 4E. In one embodiment, the application 107 (e.g., executing on the runtime module 205) performs the process 460 and is implemented in, for instance, a chip set including a processor and a memory as shown FIG. 7. As such, the application 107 and/or runtime module 205 can provide means for accomplishing various parts of the process 400 as well as means for accomplishing other processes in conjunction with other components of the UE 101 and/or searching platform 103.

Then, at 461, the application 107 receives input specifying one or more search criteria. As noted above, search criteria can be input by the user of UE 101 or can be input from other sources such as other application operating on the UE 101 or operating at other components of the system 100 such as servers, cloud computing and/or the like. For instance, the input can be from a music player indicating such criteria as artist, album, track number, track title, publisher of album, producer and/or the like. The criteria can be selected by the user via example user interface of FIGS. 6A-6G. Selection can be done via different user actions such as clicking and/or highlighting accomplished via different technologies such as touch screen, a pointing device, a selection device, a keypad and/or the like.

At 463, the application 107 causes, at least in part, a search for one or more social network sites of interest based, at least in part, on the search criteria. The application 107 can generate a query to request the search from the searching platform 103 and/or the services platform 117. Further, the application 107 can cause, at least in part, transmission of the query to the searching platform 103 and/or the services platform. This query can include a search area, a region and/or social network sites based, at least in part, on the search criteria.

At 465, the application 107 causes, at least in part, presentation of a user interface including one or more social network site feeds resulting from the search. Also, the presentation can include a map image of a region including the search location. The one or more social network site feeds can include results related to different aspects of the search criteria as well as being limited to certain social network sites preselected by the user of UE 101.

At 467, the application 107 determines whether the UE 101 or the user of UE 101 is registered with or is logged into social network sites included in the search results. In one embodiment, the UE 101 may be registered at the one or more social network site found during the search, therefore, capable of accessing the social network site. In another embodiment, the user of UE 101 may already be logged into the one or more social network site, therefore, capable of accessing the social network site. If determination at 467 indicates yes, then the process proceeds to 469, otherwise to 481 of FIG. 4E.

At 469, the application 107 associates the user of UE 101 with selected social network site. In one embodiment, the user of UE 101 is associated, with the artist of example at 461. In another embodiment, the user is associated with the social network site associated with admirers of the artist (e.g., fan club), the album, the album track, and/or the genre.

At 471, the application 107 causes, at least in part, presentation of the one or more social network site feeds to the user of UE 101. In one embodiment, the user of UE 101 can access and/or view one or more selected social network site feeds, join and/or disjoin.

At 473, the application 107 causes, at least in part, presentation of locations of other users on a map associated with the one or more social network site feeds. In one embodiment, location of other users who are associated with the same social network site feed and who are within a certain range and, for example, are at a music store may be presented on a map.

At 475, the application 107 causes, at least in part, presentation of POIs based on the one or more search criteria. In one embodiment, locations of points of interest, such as a music store which has the most recent album of artist at 461, a concert venue featuring music by the artist of 461 and/or a club which will have cover bands playing the album of the artist of 461.

FIG. 4E is a flowchart of a process for presenting search information based on search parameters including a specified location and/or social network sites, according to one embodiment. In one embodiment, the application 107 (e.g., executing on the runtime module 205) performs the process 480 and is implemented in, for instance, a chip set including a processor and a memory as shown FIG. 7. As such, the application 107 and/or runtime module 205 can provide means for accomplishing various parts of the process 400 as well as means for accomplishing other processes in conjunction with other components of the UE 101 and/or searching platform 103.

At 481, the application 107 determines whether the user of UE 101 wishes to login into or register with social network site feeds found at 465. In one embodiment, neither the user of UE 101 nor UE 101 are registered with the one or more social network site feeds and the user of UE 101 is given an opportunity to login and/or register with the one or more social network site. If the user wishes to login and/or register with the one or more social network site feeds, the process proceeds to 485.

At 485, the application 107 causes, at least in part, a request for the user of UE 101 to login and/or register with the one or more social network site feeds.

At 487, the application 107 receives authentication credentials associated with the user. By way of example, these authentication credentials may include username/passwords, access tokens, biometric information, and the like that can be used to gain access to one or more accounts of the corresponding social network services.

At 489, the application 107 causes, at least in part, the user to register and/or login with the one or more social network site feeds. In one embodiment, the user is logged into an existing account. In another embodiment, the user is newly registered (e.g., a new account created). In another embodiment, the user's existing account is renewed and user is logged into the account. The process further proceeds to 469 of FIG. 4D.

Moreover, the application 107 can receive the results of the query from the searching platform 103 and/or the services platform 117. The results can include one or more data structures associating the result of the search to one or more locations (e.g., locations on a displayed map image) and/or social network site feeds. In certain scenarios, the locations are associated in the data structures as positioning coordinates. Additionally or alternatively, the data structures can further include information about the locations of interest or POIs in the search results. This information can include tags or types associated with the POI as well as information about reviews, description, etc. Additionally, this information may be utilized in the search. Moreover, in certain embodiments, the search is conducted on the UE 101 using a map database 209 and/or other memory 211 on the UE 101. Further, the search results may be filtered based on one or more criteria. One such criterion can be time. For example, if time parameters are input, the search can account for time (e.g., search results that are not open during the specified time or time period are filtered out of the search results that can be presented). In another embodiment, the social network site feeds can be presented via the user interface for further selection and action. In another embodiment, the social network site feeds can be related to events and activities suitable for presentation on a map. For example, a particular music store or other establishment can be shown on a map if related to search criteria.

This can occur while the search and search ripple of process 420 are being presented via the UE 101. As noted above, various types of technology (e.g., touch screen, point and click, etc.) can be utilized to receive the input. Using a similar approach to process 420, the application 107 causes, at least in part, presentation in the user interface of one or more other animations of one or more other ripples emanating from the specified search locations (at 423). With the additional search locations and/or search ripples, additional factors may be utilized in determining when and whether to display a POI result. In certain embodiments, additional input can be received specifying additional search criteria. For example, additional search criteria can include key words searching for another POI. Thus, a first search query can be presented via the first search location and another search query can be presented via a second search location. The second search query can be a part or modification of the first search query or can be a separate search query. As previously described, a search area for each additional search location can be specified using a user interface as described in FIGS. 3C and 3D.

In a manner similar to 407, the application 107 determines that an edge of a ripple associated with the second search location is within a predetermined distance of a POI (at 425). In certain embodiments, the POI is the same POI to be presented via 409. In other embodiments, the POI is associated with the second search query and the second search query is mutually exclusive (or partially mutually exclusive) from the first search query. As such, the presentation of the POI or other POIs can be based, at least in part, on input parameters according to one or more rules.

In one embodiment, at 427, the application 107 receives one or more time parameters associated with the search location. These time parameters may be utilized in determining when and whether a POI of the search results should be presented. For example, the time parameters may include when the user plans to be in and around the search location. In certain embodiments, the search results of the POIs include an operational time as to when the user will be able to access the POI. The operational time can be passed via the search to receive the search results or can be compared at by the application 107. As such, at 429, the application 107 can determine the hours of operation of POIs in the search results by parsing the hours of operation from POI information received as part of the search results. Further, the time parameters can be specified using a touch screen input as described in FIGS. 3C and 3D. In this scenario, the time parameters can be set based on the amount of time the user depresses a touch screen, the pressure of the depression, or the like. When the user stops the input (e.g., by taking the user's finger off of the touch screen input), the time parameter is set. For example, a time can be displayed on the user interface. The time can increase while the input is depressed and set when the input is no longer present.

At 431, the POI (or a group of POIs) is caused to be presented based on rules. One such rule is that only POIs that are operational during the time that the user inputs (e.g., a predetermined threshold time before and/or after a single time input or a time range) are presented. Another exemplary rule is that a POI is only presented if the POI is within one or more predetermined distances from more than one ripple emanating from different search locations. Further, an exemplary rule can include presenting the POI based on the number or concentration of other searched for POIs within a proximity of the POI. With this approach, a POI is not presented unless a sufficient threshold number of POIs are within a certain range of the POI. Additionally or alternatively, the rule may include a parameter for each of the search locations and their respective search results. The search results can be different for each search location. As such, a threshold number of more than one of the search results can be required for presentation. For example, if there are three search locations with different searches, at least one of two (or all three) of the searches associated with the search locations may be required by the rule to yield results within a range, area, or region of the POI in question of being presented.

Figure 5B:
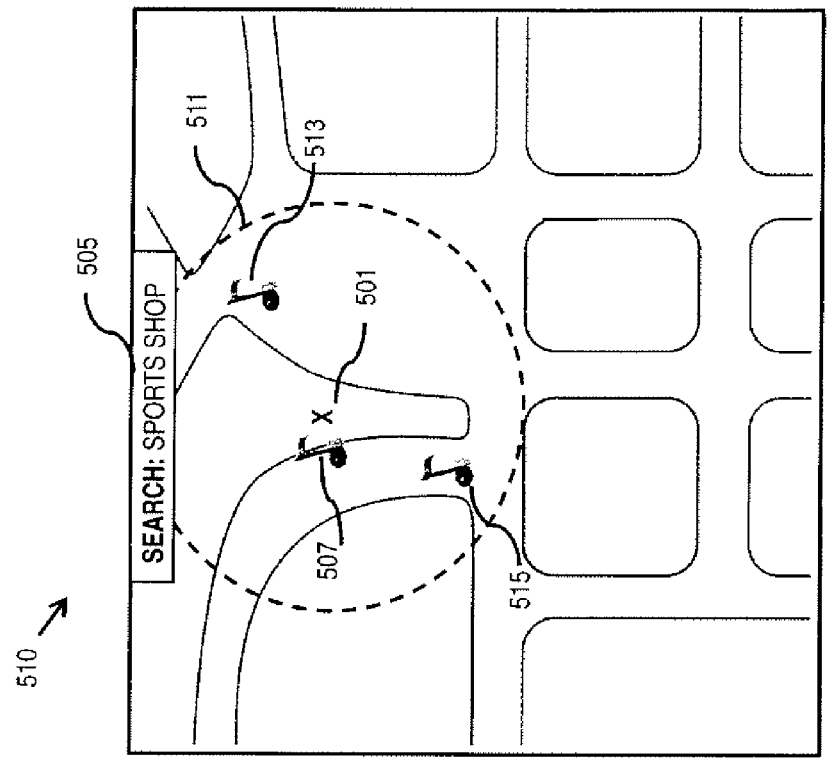
FIGS. 5A-5G are diagrams of user interfaces utilized in the processes of FIGS. 4A-4C, according to various embodiments.
Figure 5A:
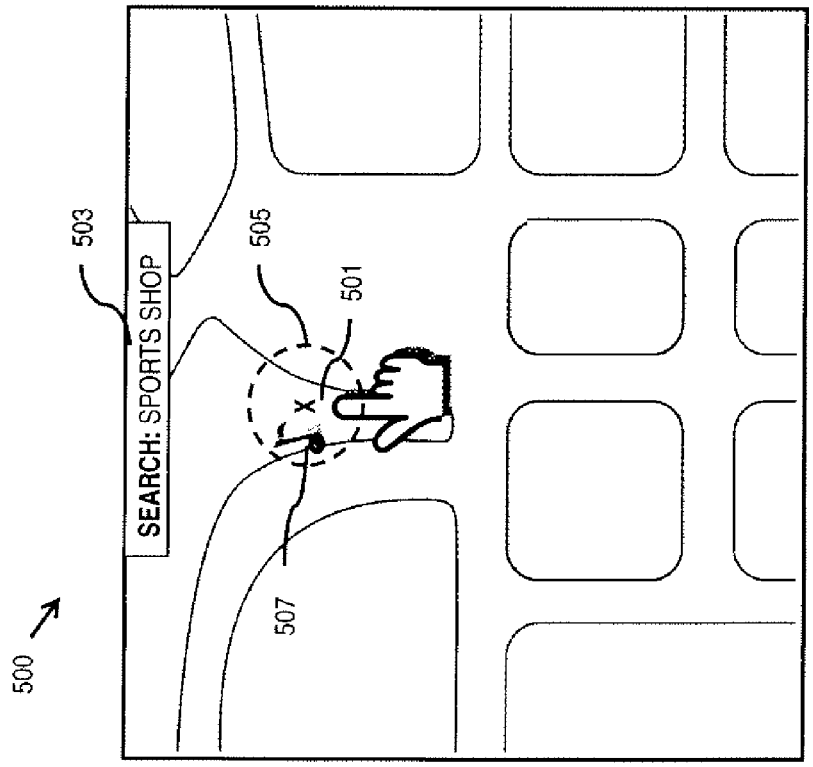
Figure 5D:
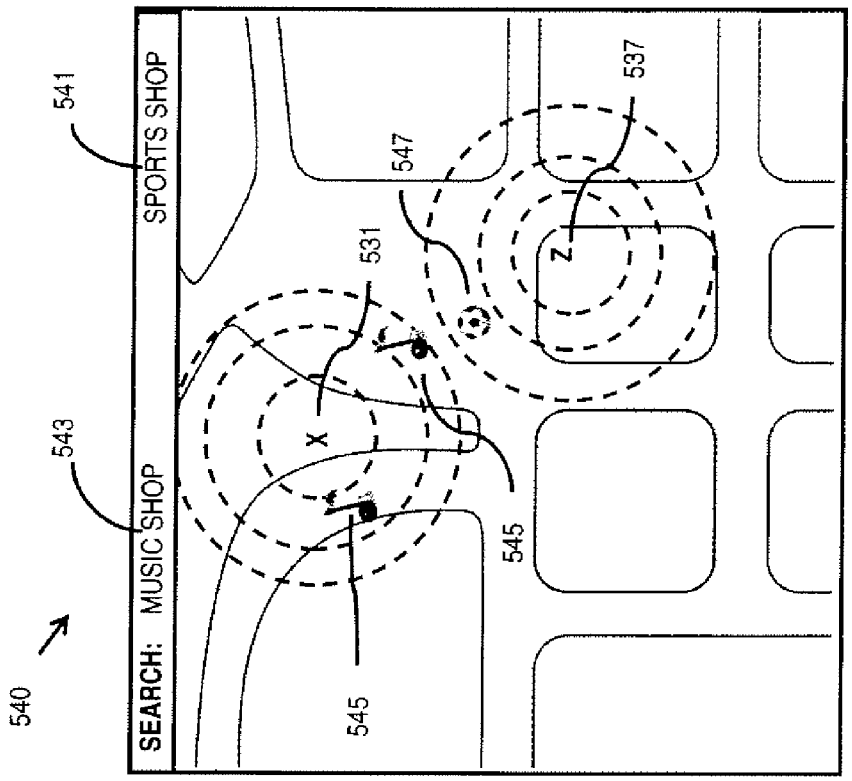

FIGS. 5A-5G are diagrams of user interfaces utilized in the processes of FIGS. 4A and 4B, according to various embodiments. FIG. 5A shows a GUI 500 that can receive input (e.g., a touch screen input) marking a search location 501 for presenting searched for POIs. The GUI 500 then causes a search for search results (e.g., POIs). For example, a search for a sports shop 503 based on the search location 501. When the search is completed, an application 107 can present POIs in accord with a search ripple 505 emanating from the search location 501. As the search ripple approaches or passes a search result POI 507, the POI is presented. As shown in GUI 510, as the search ripple extends, additional search result POIs 513, 515 are presented.

Figure 5C:
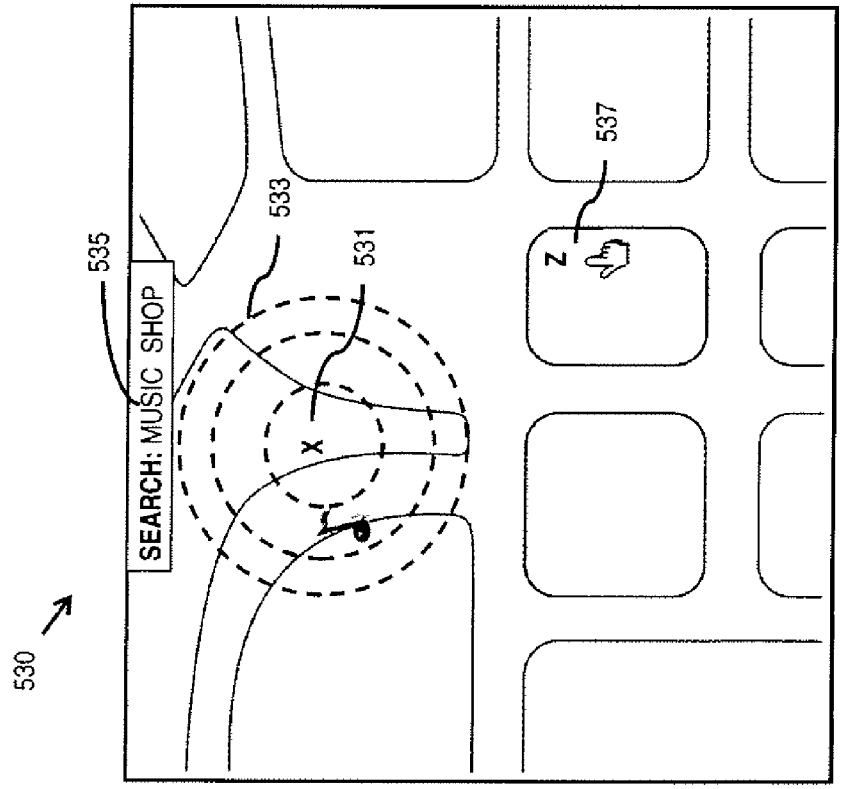

As shown in FIG. 5C, GUI 530 shows a first search location 531 with search ripples 533 emanating from the first search location 531. This search location 531 can be associated with a search for a music shop 535. Further, the user may select a second (or additional) search location 537 in addition to the first search location 531. The user may additionally conduct another search based, at least in part, on the second search location 537. As shown in GUI 540, the second search location 537 can be associated with a search for a sports shop 541 while the first search location 531 is associated with the search for music shops 543. In this example, the search for the music shop 543 can be tagged to the first search location 531, where the results for music shops 543 from the first search location 531 displays a music POI 545. Additionally, the results for sports shops 541 are tagged to the second search location 537 and display a sports POI 547. The POIs 545, 547 can be presented according to rules as described above.

Figure 5E:
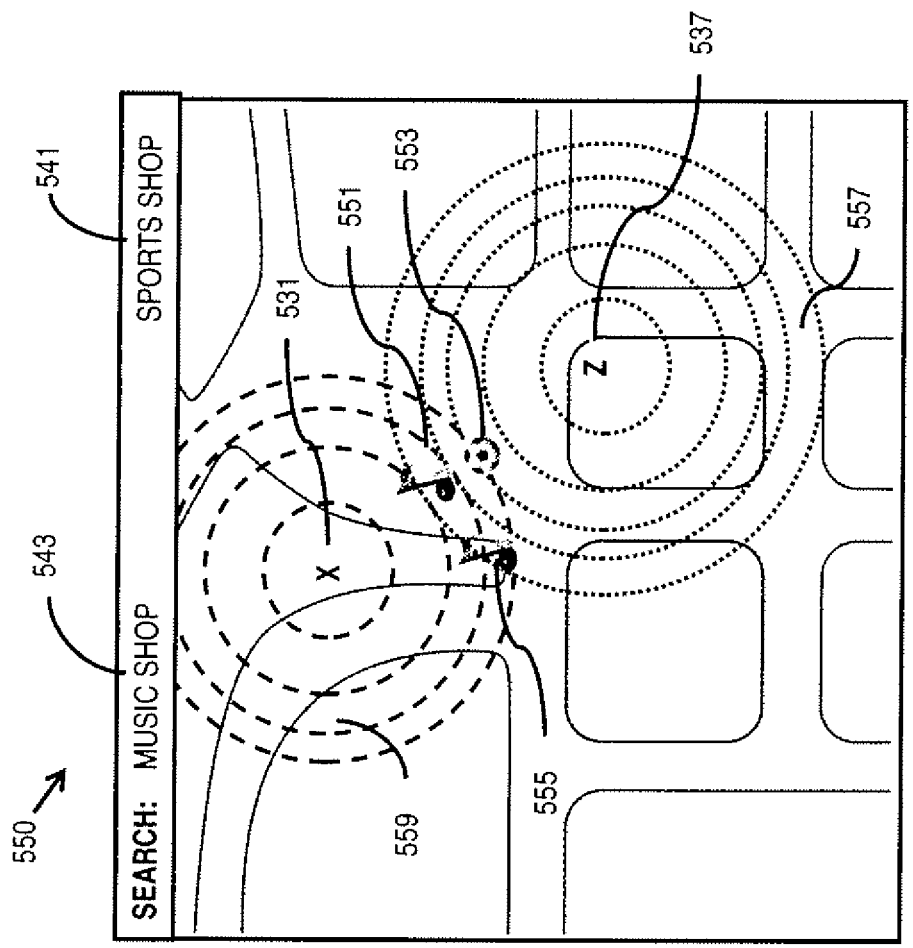

The GUI 550 of FIG. 5E displays a presentation of the search for the sports shop 541 and music shop 543 according to a predetermined set of rules. In this scenario, the searched for POIs 551, 553, 555 can be presented if search ripples associated with each search location 531, 537 are within a predetermined distance of the POIs 551, 553, 555. As such, other POIs not covered by both search ripples are not presented to the user. In certain scenarios, the presentation occurs only while search ripples are actively within the predetermined distance of the POIs 551, 553, 555. As such, one or more of the POIs 551, 553, 555 can be removed from the presentation according to a rule.

Additional rules can be associated with presentation of the POIs according to more than one search ripple. For example, combinations of regions where a ripple from the first search location 531 and a ripple from the second search location 537 can be utilized in determining which POIs to present. One example is the previously discussed intersection of ripples. Another example is a more tailored intersection, for example, if multiple ripples are simultaneously emanating (e.g., more than one search ripple associated with a search location presented at a single time) from a single search location 531, 537, intersections of regions between two ripples (e.g., region 557 and region 559) can be utilized for presentation.

Figure 5G:
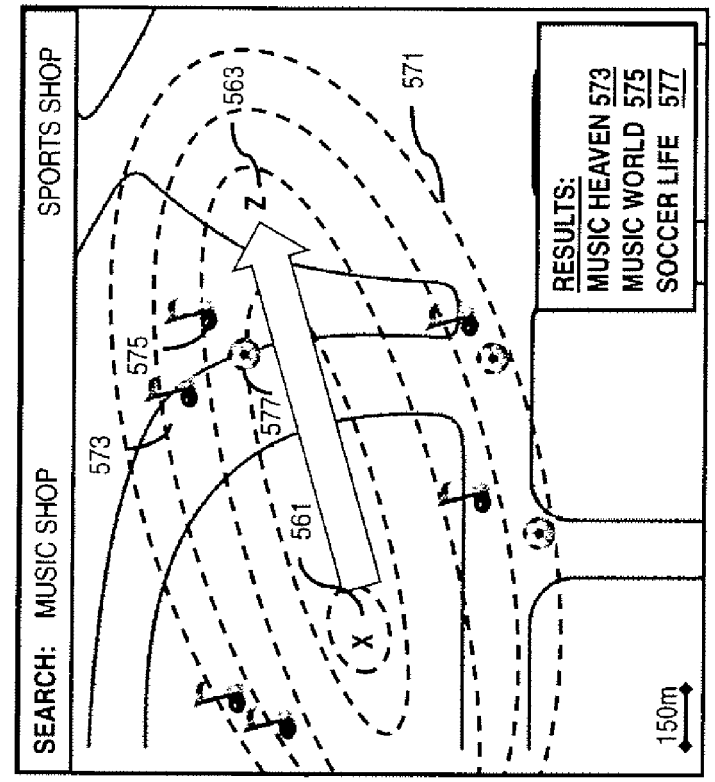
Figure 5F:
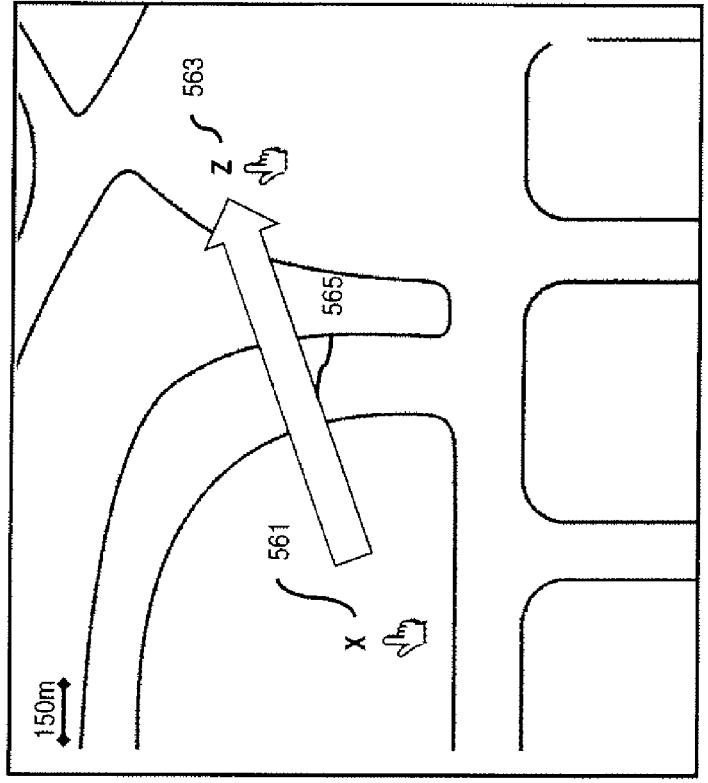

FIGS. 5F and 5G show GUIs 560, 570 that provide for presentation of POIs according to a search query. In GUI 560, a first search location 561 and a second search location 563 are selected for conducting a search. The settings of the application 107 can be set so that search ripples only emanate from the first search location 561 during the presentation. The first and second search locations 561, 563 are locations where the user wishes to be at certain input times. For example, the user may wish to be at search location 561 at 1 PM and at location 563 at 3 PM. As such, the search and presentation can be formulated in a manner that preference is provided to displaying POIs closer to a path 565. Thus, search ripples 571 are formulated to be shaped in the direction of the path 565 between the search locations 561, 563. With this approach, POIs more closely associated with the path can be presented. Further, a maximum distance correlating to the shape (e.g., according to a particular point of the shape) from the search locations 561, 563 can be determined and presented. As such, the ripples only expand to a predetermined size. Thus, POIs not within the ripples may not be shown.

Further, a recommendation can be made for which POIs 573, 575, 577 the user should go to. As previously noted, the recommendation can be based on a concentration of the POIs, how close the POIs are to the path, or other rules. This can be represented by text, icons, or other visual indicators presenting the POIs. Also, the POIs displayed can be filtered according to one or more rules (e.g., based on operational times). The recommendation can be determined based on actual routes available towards the second search location 563, the mode of travel of the user, which may be set by the user, etc. Moreover, in certain embodiments, the recommended POIs 573, 575, 577 are presented persistently while other POIs matching the search results are presented based on oscillations of the search ripples (e.g., presented when a first ripple passes the POI, removed from presentation when a second ripple passes over the POI, and presented once more when a third ripple passes over the POI). Further, the results of one or more POIs (e.g., POIs 573, 575, 577) can be presented in a results window. The results window can show additional information about the POIs 573, 575, 577, such as an address, phone number, a description, etc.

With the above approaches, users are presented with a novel way of searching for and viewing POIs in relation with search ripples. Search ripples allow for the user to more easily identify POIs that the user is interested in with less confusion. As such, there is less need for the user to conduct additional searches, zoom in and out, etc. that uses additional power consumption from the UE 101. Further, because fewer changes in presentation are needed, in the case that parts of the presentation are downloaded from an external source, the communications bandwidth and power costs are reduced.

The processes described herein for providing presentation of POIs based on search ripples may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6B:
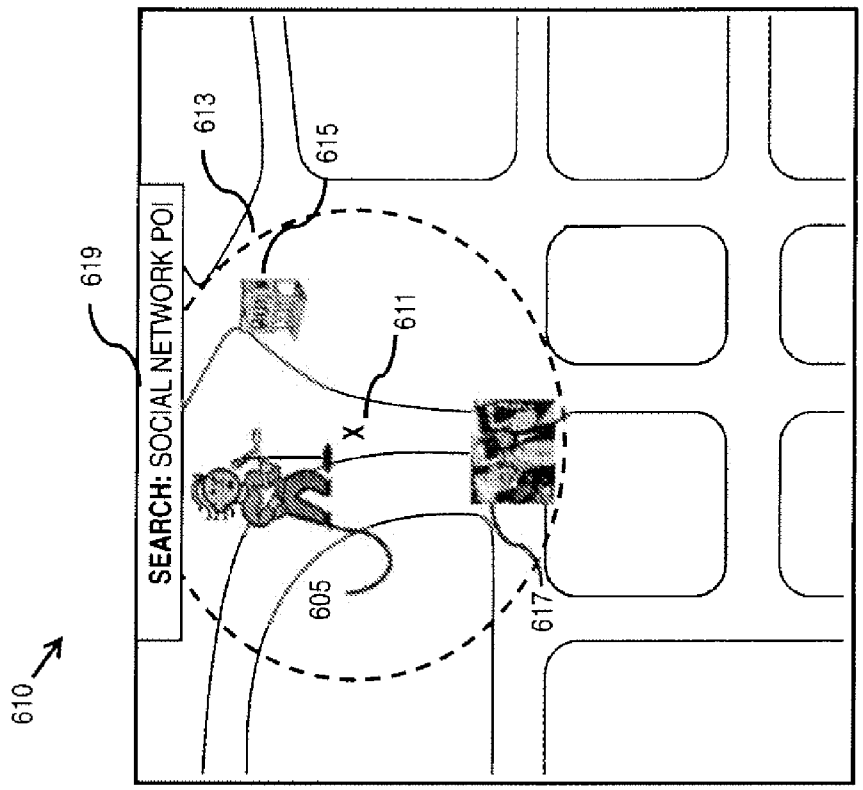
FIGS. 6A-6G are diagrams of user interfaces utilized in the processes of FIGS. 4A, 4D-4E, according to various embodiments.
Figure 6A:
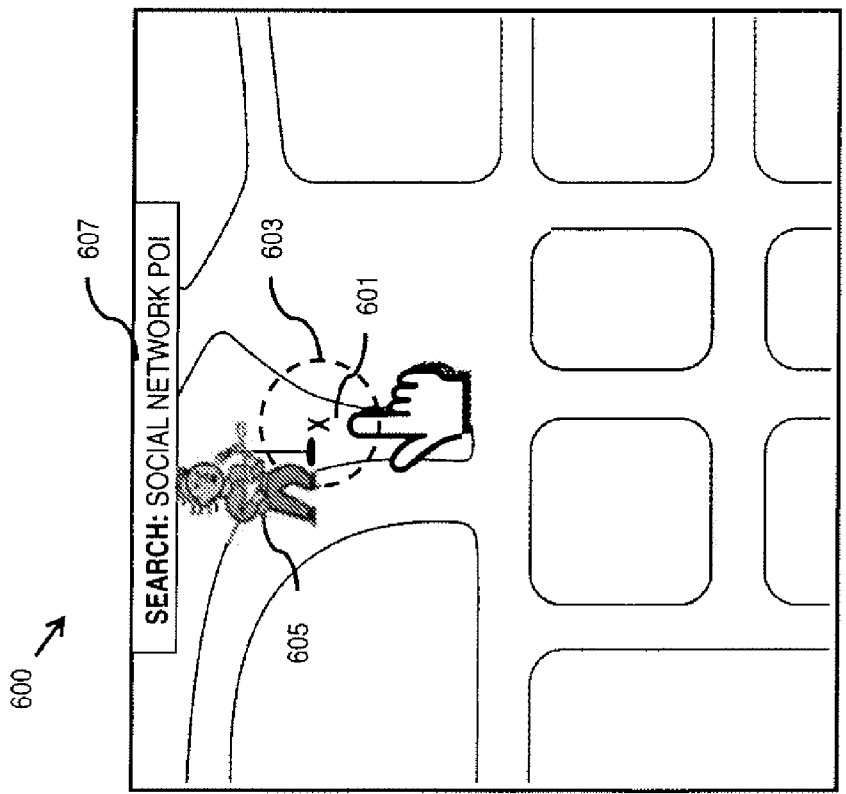

FIGS. 6A-6G are diagrams of user interfaces utilized in the processes of FIGS. 4A-4E, according to various embodiments. FIG. 6A shows a GUI 600 that can receive input (e.g., a touch screen input) marking a search location 601 for presenting searched for POIs. The GUI 600 then causes a search for search results (e.g., POIs). For example, a search for a social network site POI 607 based on the search location 601. When the search is completed, an application 107 can present POIs in accord with a search ripple 605 emanating from the search location 601. As the search ripple approaches or passes a search result POI 607, the POI is presented. As shown in GUI 610, as the search ripple extends, additional search result POIs 615, 617 are presented.

Figure 6D:
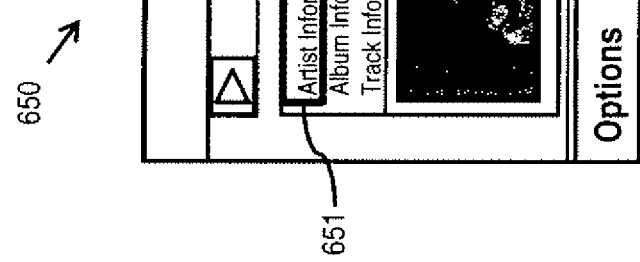
Figure 6C:
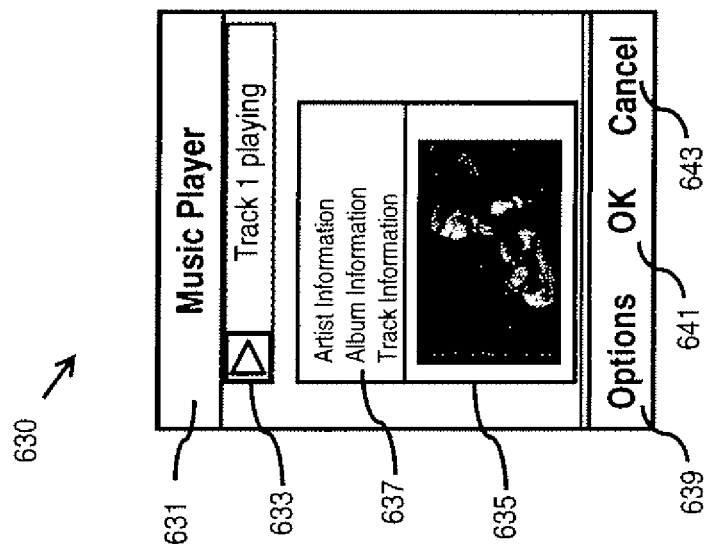

FIG. 6C is an example GUI 630 for playing a music media (e.g., a music compact disc). Title window 631 shows that the function performed is a "Music Player" application. The selection panel 633 shows "Track 1 playing." Further, information panel 635 is showing information related to the musical album. For example, information shown may be obtained from the music media itself, services platform 117, searching platform 103 and/or a combination thereof. Different levels of information can be shown, for example, depending on configurations of the UE 101, the application 107, services platform 117, searching platform 103 and/or a combination thereof. The selection panel 637 allows the user of UE 101 to select one or more informational item as one or more search criteria. Options button 639 may be selected to display a window of options that can be selected. The OK button 641 may be selected to go forward with a selected option. The Cancel button 643 may be selected to cancel a selected option.

Figure 6F:
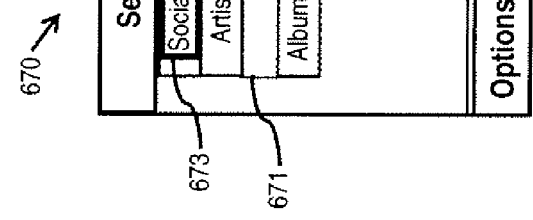
Figure 6G:
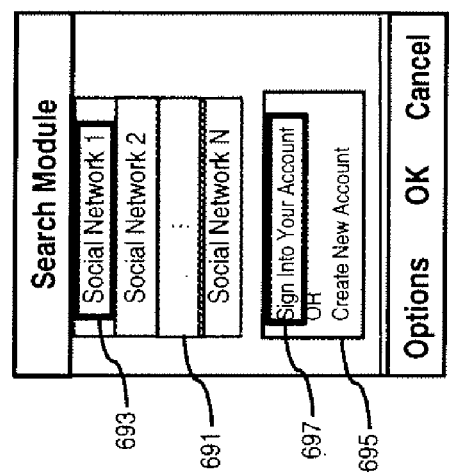
Figure 6E:
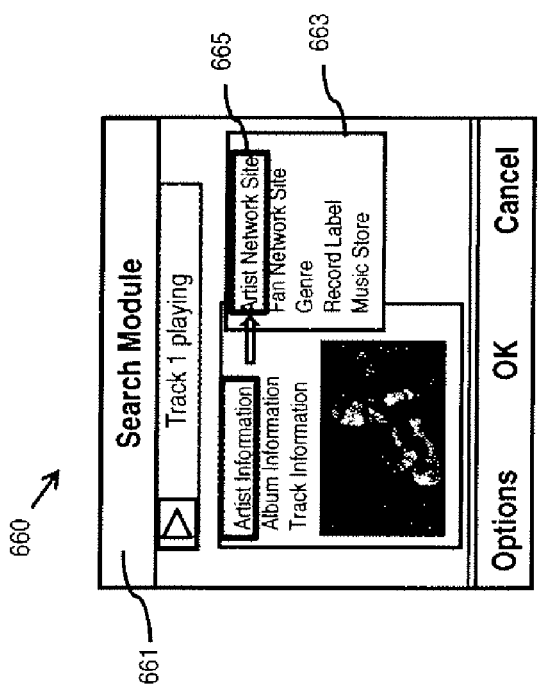

FIG. 6D shows GUI 650 for selecting an informational item 651, such as "Artist Information", which can be one search criteria as input into search module 115. FIG. 6E shows GUI 660 for the search module 115. Title window 661 shows "Search Module" is active and will further interact with user of UE 101. A further selection panel 663 is showing additional search criteria options. 665 is showing "Artist Network Site" selected as one search criteria. FIG. 6F shows GUI 670 for further selecting a categorization method. Selection panel 671 allows the user of UE 101 to select from a list of options. 673 is shown selecting "Social Network Sites" as categorization type. FIG. 6G shows GUI 690 to further select a categorization option. 691 shows a list of possible selection types of social network sites by which the search results can be categorized. 693 shows selection of "Social Network 1".

695 shows a selection window with options for a user to login into an existing account or creating a new account. 697 shows selecting "Sign into Your Account" option.

Figure 7:
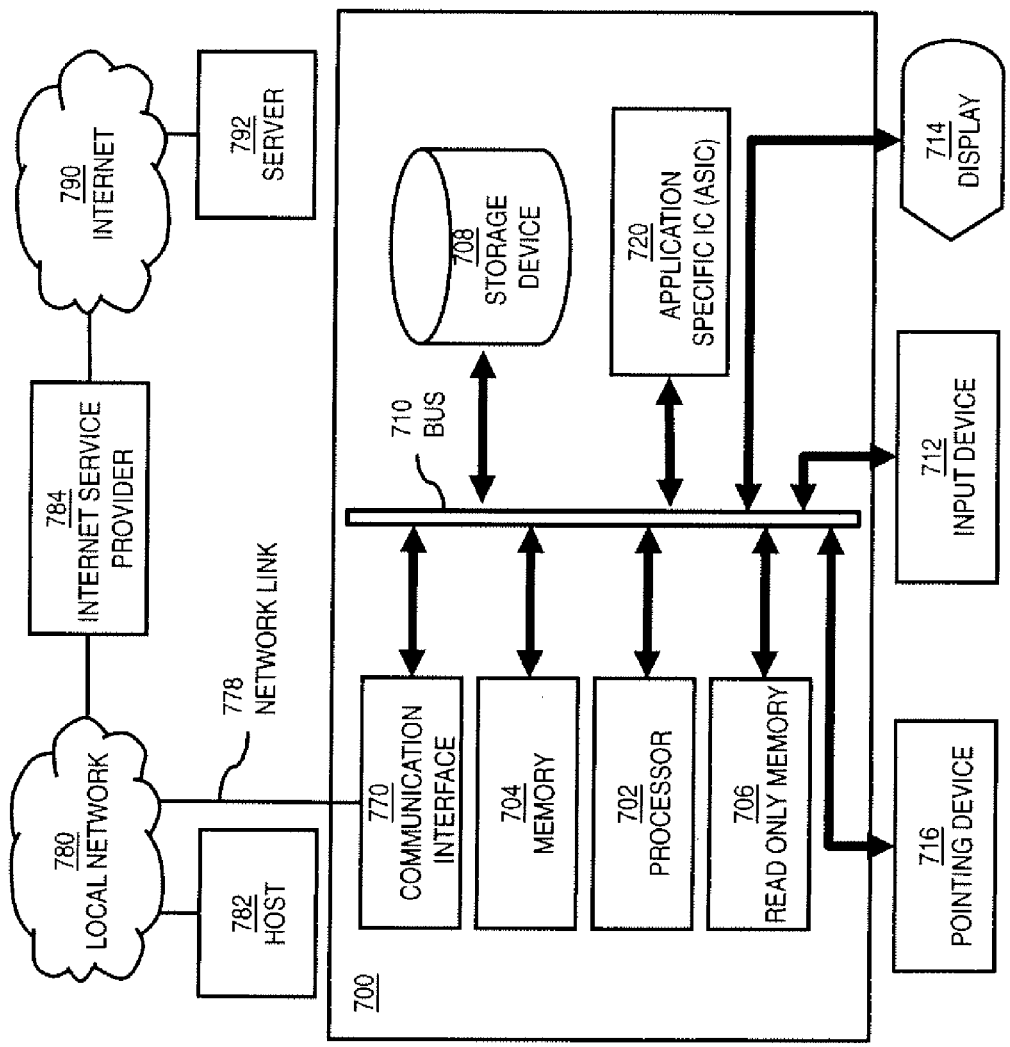
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide presentation of POIs based on search ripples as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of presenting POIs based on search ripples.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to the presentation of POIs based on search ripples. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for presentation of POIs based on search ripples. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for presentation of POIs based on search ripples, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
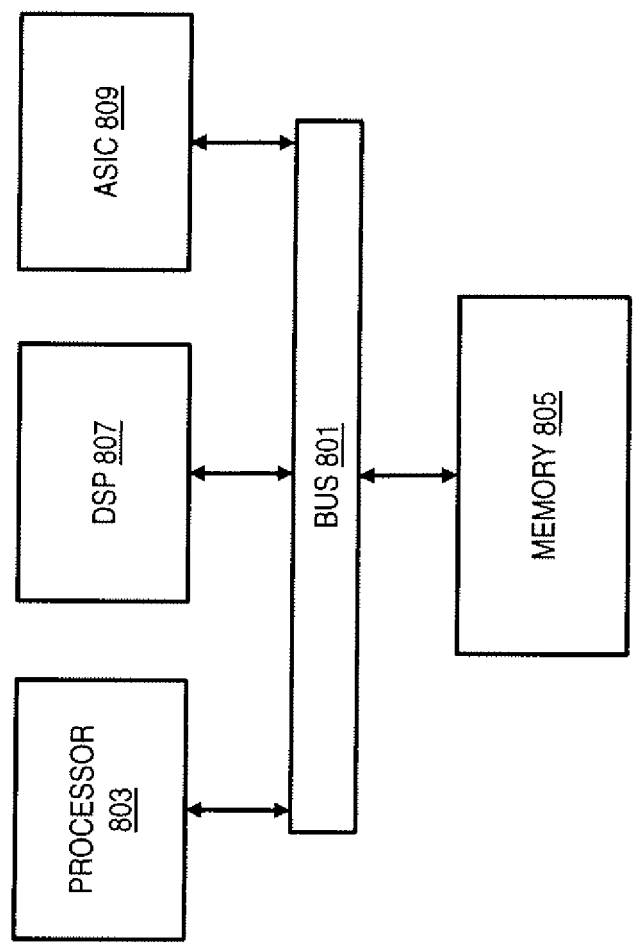
FIG. 8 is a diagram of a chip set that can be used to implement an embodiment of the invention.

FIG. 8 illustrates a chip set or chip 800 upon which an embodiment of the invention may be implemented. Chip set 800 is programmed to present POIs based on search ripples as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of services. Chip set or chip 800, or a portion thereof, constitutes a means for performing one or more steps of presenting POIs based on search ripples.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to present of POIs based on search ripples. The memory 805 also stores the data associated with or generated by the execution of the inventive steps.

Figure 9:
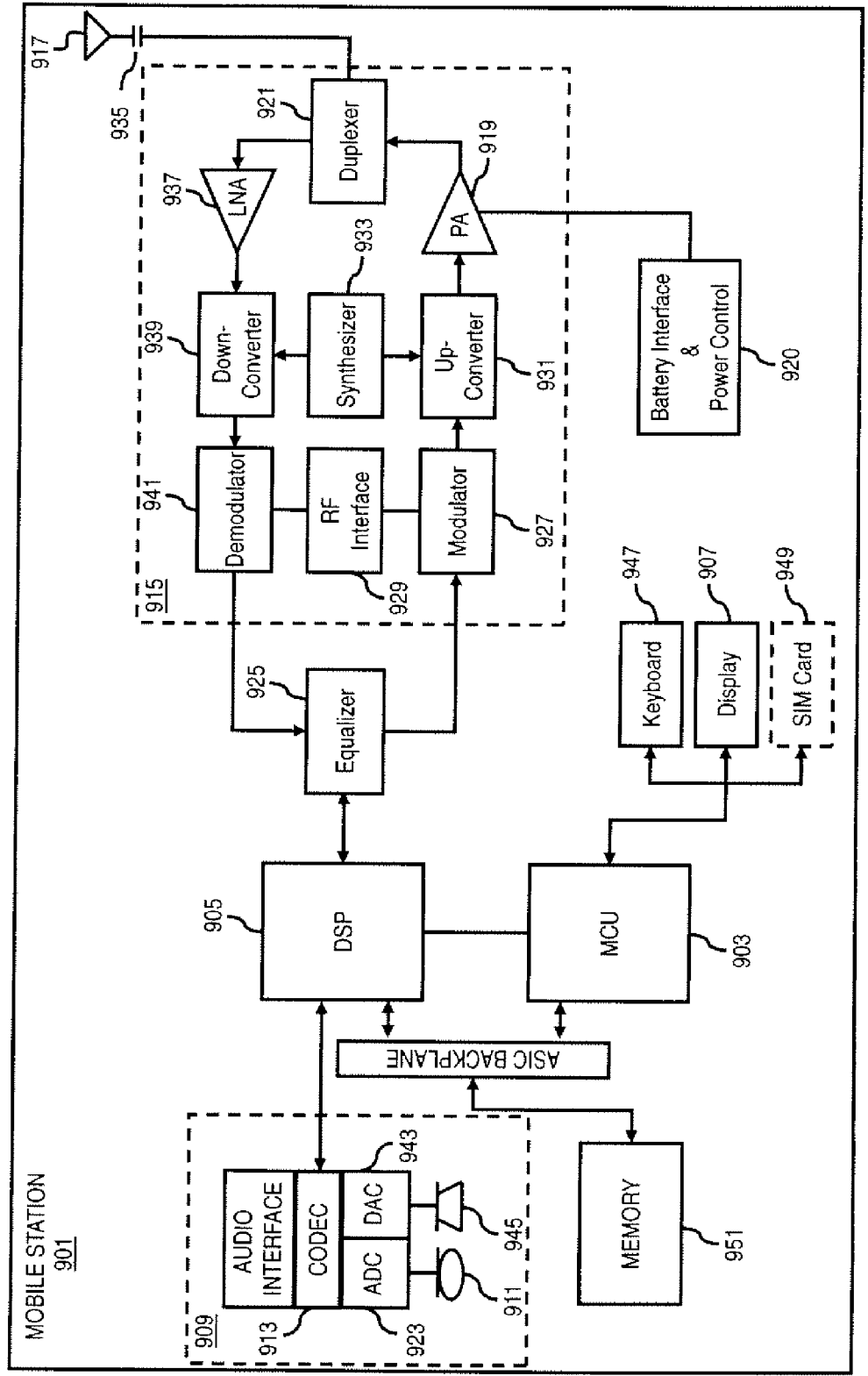
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of presenting POIs based on search ripples. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of presenting POIs based on search ripples. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to present POIs based on search ripples. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
 receiving an input at a device for specifying one or more search criteria;
 causing, at least in part, a search for one or more services based, at least in part, on the one or more search criteria; and
 causing, at least in part, presentation of a user interface depicting an animation relating to a search location associated with the one or more search criteria based, at least in part, on the search, one or more results of the search, the one or more services, or a combination thereof, wherein the animation includes, at least in part, one or more ripples emanating from a search location.

2. A method of claim 1, further comprising:
 determining one or more locations of interest based, at least in part, on the search location, the one or more search criteria, or a combination thereof; and
 causing, at least in part, presentation of at least one of the one or more locations of interest in the user interface based, at least in part, on the determination that the edge of at least one of the one or more ripples is within a predetermined distance of the at least one location of interest.

3. A method of claim 2, further comprising:
 receiving another input for specifying another search location associated with one or more other search criteria, wherein the search is further based, at least in part, on the one or more search criteria, the another search location, the one or more other search criteria, or a combination thereof;
 causing, at least in part, presentation in the user interface of another animation of one or more other ripples emanating from the another search location; and
 determining that another edge of at least one of the one or more other ripples is within a predetermined distance of the one location of interest, wherein the presentation of the at least one location of interest is further based, at least in part, on the determination with respect to the another edge.

4. A method of claim 3, wherein the input, the another input, or a combination thereof include, at least in part, a respective time parameter, the method further comprising:
 determining whether hours of operation of the at least one location of interest are within the time parameters, wherein the presentation of the one at least location of interest is further based, at least in part, on the determination with respect to the time parameters.

5. A method of claim 3, wherein the input, the another input, or a combination thereof include, at least in part, a respective time parameter, the method further comprising:
 receiving information specifying a plurality of destinations from among the one or more locations of interest; and
 generating a recommendation specifying a plurality of the one or more locations of interest as the respective plurality of destinations based, at least in part, on whether a user can travel among the recommended locations of interest within the time parameters.

6. A method of claim 2, wherein characteristics of the presentation of the at least one location of interest is further based, at least in part, on a proximity of the at least one location of interest to the edge of the at least one ripple, the characteristics including, at least in part, visual characteristics, audio characteristics, or a combination thereof.

7. A method of claim 2, wherein the input includes a length of time associated with the search location, the method further comprising:
    determining a perimeter based, at least in part, on the length of time, wherein the presentation of the one or more ripples is bound by the perimeter, and wherein the search is further based, at least in part, on the perimeter.

8. A method of claim 2, further comprising:
    receiving another input for specifying a frequency, a speed, or a combination thereof of the ripples, wherein the animation is based, at least in part, on the another input.

9. A method of claim 1, wherein the one or more services include, at least in part, a social networking service, and wherein the search for the one or more services comprises:
    selecting one or more feeds of the social networking service based, at least in part, on the one or more search criteria.

10. A method of claim 9, further comprising:
    determining whether a user of the device is registered with, logged into, or a combination thereof with respect to the social networking service; and
    suggesting registration with, logging into, or the combination thereof with respect to the social networking service based, at least in part on the determination.

11. A method of claim 9, further comprising:
    causing, at least in part, association of the one or more feeds with an account of the social network service, the account associated with a user of the device.

12. A method of claim 11, further comprising:
    receiving authentication credentials associated with the user for accessing the social networking service, wherein the association of the one or more feeds with the account is based, at least in part, on the authentication credentials.

13. A method of claim 1, further comprising:
    determining context information associated with a device, a user of the device, the one or more services, the one or more criteria, or a combination thereof, wherein the search is further based, at least in part, on the context information.

14. A method of claim 1, wherein the animation includes, at least in part, one or more ripples emanating from the search location, the method further comprising:
    causing, at least in part, presentation of at least one location of interest that is within proximity, a predetermined distance, or a combination thereof of an edge of at least one of the one or more ripples.

15. An apparatus comprising:
    at least one processor; and
    at least one memory including computer program code, the at least one memory and the computer program code configured to, with the at least one processor, cause the apparatus to perform at least the following,
        receive an input at a device for specifying one or more search criteria;
        cause, at least in part, a search for one or more services based, at least in part, on the one or more search criteria; and
        cause, at least in part, presentation of a user interface depicting an animation relating to a search location associated with the one or more search criteria based, at least in part, on the search, one or more results of the search, the one or more services, or a combination thereof, wherein the animation includes, at least in part, one or more ripples emanating from a search location.

16. An apparatus of claim 15, wherein the apparatus is further caused to:
    determine one or more locations of interest based, at least in part, on the search location, the one or more search criteria, or a combination thereof; and
    cause, at least in part, presentation of at least one of the one or more locations of interest in the user interface based, at least in part, on the determination that the edge of at least one of the one or more ripples is within a predetermined distance of the at least one location of interest.

17. An apparatus of claim 16, wherein the apparatus is further caused to:
    receive another input for specifying another search location associated with one or more other search criteria, wherein the search is further based, at least in part, on the one or more search criteria, the another search location, the one or more other search criteria, or a combination thereof;
    cause, at least in part, presentation in the user interface of another animation of one or more other ripples emanating from the another location; and
    determine that another edge of at least one of the one or more other ripples is within a predetermined distance of the at least one location of interest, wherein the presentation of the at least one location of interest is further based, at least in part, on the determination with respect to the another edge.

18. An apparatus of claim 16, wherein characteristics of the presentation of the at least one location of interest is further based, at least in part, on a proximity of the at least one location of interest to the edge of the at least one ripple, the characteristics including, at least in part, visual characteristics, audio characteristics, or a combination thereof.

19. An apparatus of claim 15, wherein the one or more services include, at least in part, a social networking service, and wherein the search for the one or more services causes the apparatus to:
    select one or more feeds of the social networking service based, at least in part, on the one or more search criteria.

20. An apparatus of claim 19, wherein the apparatus is further caused to:
    cause, at least in part, association of the one or more feeds with an account of the social network service, the account associated with a user of the device.

* * * * *